United States Patent
M M et al.

(10) Patent No.: US 12,052,350 B2
(45) Date of Patent: Jul. 30, 2024

(54) QUANTUM RESISTANT SECURE KEY DISTRIBUTION IN VARIOUS PROTOCOLS AND TECHNOLOGIES

(71) Applicant: Cisco Technology, Inc., San Jose, CA (US)

(72) Inventors: Niranjan M M, Karnataka (IN); Nagaraj Kenchaiah, Karnataka (IN)

(73) Assignee: Cisco Technology, Inc., San Jose, CA (US)

(*) Notice: Subject to any disclaimer, the term of this patent is extended or adjusted under 35 U.S.C. 154(b) by 477 days.

(21) Appl. No.: 17/370,888

(22) Filed: Jul. 8, 2021

(65) Prior Publication Data
US 2023/0014894 A1    Jan. 19, 2023

(51) Int. Cl.
*H04L 9/08* (2006.01)
*H04L 5/00* (2006.01)
(Continued)

(52) U.S. Cl.
CPC .......... *H04L 9/0852* (2013.01); *H04L 5/0053* (2013.01); *H04L 9/0819* (2013.01);
(Continued)

(58) Field of Classification Search
CPC ................ H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
(Continued)

(56) References Cited

U.S. PATENT DOCUMENTS 5,764,765 A * 6/1998 Phoenix ................ H04L 9/0858
                                              380/256
6,748,083 B2 * 6/2004 Hughes ................ H04L 9/0858
                                              380/278

(Continued)

FOREIGN PATENT DOCUMENTS

| CN | 111756530 | 10/2020 |
|---|---|---|
| CN | 112332984 | 2/2021 |
| WO | 2020006162 | 1/2020 |

*Primary Examiner* — Sharif E Ullah
(74) *Attorney, Agent, or Firm* — Polsinelli P.C.

(57) ABSTRACT

A quantum resistant method is provided for supporting user equipment (UE) roaming across APs/eNBs/gNBs belonging to various Wireless LAN Controllers (WLCs) in enterprise 5G and WiFi co-located deployments. The method may include initializing a SKS server in an electrical communication with a master WLC with a random post-quantum common secret seed (PQSEED) to generate a post-quantum pre-shared key (PQPSK) and a respective PQPSK-ID. The method may also include sending an encrypted PQSEED along with a PQPSK-ID to a second WLC. The method may further include joining AP (WiFi) to the master WLC using a CAPWAP/DTLS protocol. The method may further include sending the PQPSK-ID from the master WLC to the UE in an EAP success packet when the UE is associated with the AP (WiFi).

20 Claims, 17 Drawing Sheets

(51) Int. Cl.
  *H04L 9/30* (2006.01)
  *H04W 36/10* (2009.01)
  *H04W 76/11* (2018.01)
  *G06N 10/00* (2022.01)
  *H04L 67/1097* (2022.01)
  *H04W 84/04* (2009.01)
  *H04W 84/12* (2009.01)

(52) U.S. Cl.
  CPC ............... *H04L 9/085* (2013.01); *H04L 9/30* (2013.01); *H04W 36/10* (2013.01); *H04W 76/11* (2018.02); *G06N 10/00* (2019.01); *H04L 67/1097* (2013.01); *H04W 84/042* (2013.01); *H04W 84/12* (2013.01)

(58) Field of Classification Search
  USPC ........ 713/171, 150, 163, 181; 726/2, 21, 36; 380/255, 264, 276
  See application file for complete search history.

(56) References Cited

U.S. PATENT DOCUMENTS

| | | | | |
|---|---|---|---|---|
| 7,437,081 | B2* | 10/2008 | Mitchell | H04B 10/70 398/154 |
| 8,675,876 | B2* | 3/2014 | Yamamoto | H04L 9/0858 380/278 |
| 8,855,316 | B2* | 10/2014 | Wiseman | H04L 9/0855 380/278 |
| 9,960,465 | B2* | 5/2018 | Dudley | H01M 50/204 |
| 10,057,058 | B2* | 8/2018 | Murakami | H04L 9/0858 |
| 10,541,809 | B2* | 1/2020 | Godfrey | H04B 10/70 |
| 2005/0138352 | A1* | 6/2005 | Gauvreau | H04L 9/3247 713/153 |
| 2007/0065154 | A1* | 3/2007 | Luo | H04J 14/0282 398/141 |
| 2007/0076884 | A1* | 4/2007 | Wellbrock | H04L 9/0855 380/263 |
| 2007/0195774 | A1* | 8/2007 | Sherman | H04L 69/16 370/392 |
| 2011/0206204 | A1* | 8/2011 | Sychev | H04J 14/0273 380/256 |
| 2011/0213979 | A1* | 9/2011 | Wiseman | H04L 9/0844 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/5038 |
| 2017/0214525 | A1* | 7/2017 | Zhao | H04W 12/0431 |
| 2017/0230173 | A1* | 8/2017 | Choi | H04L 9/0861 |
| 2018/0176091 | A1* | 6/2018 | Yoon | H04L 43/0888 |
| 2019/0036821 | A1* | 1/2019 | Levy | G06F 12/0868 |
| 2019/0349392 | A1* | 11/2019 | Wetterwald | H04L 43/0852 |
| 2020/0084222 | A1* | 3/2020 | William | H04L 63/12 |
| 2020/0274701 | A1* | 8/2020 | Yuan | H04L 9/0841 |
| 2020/0280436 | A1* | 9/2020 | Nix | H04L 9/3066 |
| 2020/0322141 | A1* | 10/2020 | Kinjo | H04L 9/0852 |
| 2022/0345938 | A1* | 10/2022 | Gupta | H04W 88/10 |
| 2023/0111629 | A1* | 4/2023 | Van Wageningen | H04B 10/1129 398/118 |
| 2023/0337068 | A1* | 10/2023 | Van Wageningen | H04W 36/00835 |

* cited by examiner

QUANTUM RESISTANT SECURE KEY DISTRIBUTION IN VARIOUS PROTOCOLS AND TECHNOLOGIES

FIELD

The disclosure is directed to quantum secure network communication. In particular, the disclosure relates to quantum resistant UE roaming across enterprise 5G deployments with co-located Private LTE and WiFi. The disclosure also relates to quantum resistant key generation and exchange for the Private LTE when both WiFi and Private LTE functions are co-located. The disclosure also relates to quantum resistant CAPWAP tunnels between the WLC and the AP in large enterprise WiFi deployments or wireless LAN deployments. The disclosure also relates to establishing a quantum resistant SXP connection between Speaker and Listener. The disclosure also relates to establishing a quantum resistant BGP session between BGP peers. The disclosure also relates to a quantum resistant secure DNS packet exchange in Umbrella/OpenDNS deployments or SD-WAN and SIG (Secure Internet Gateway) deployments, by using a DNSCrypt protocol. The disclosure also relates to quantum secure communication in SDWAN cluster deployments.

BACKGROUND

There have been developing efforts around the world in building quantum computers. Cryptanalytic attacks may be accelerated by these quantum computers. In particular, Shor's algorithm is thought to undermine the foundations for deployed public key cryptography: Rivest-Shamir-Adleman (RSA) and the discrete-logarithm problem in finite fields and elliptic curves. Long-term confidential documents such as patient health-care records and state secrets are supposed to have guaranteed security for many years. However, when the quantum computers become available, the information encrypted today using RSA or elliptic curves and stored will then be potentially as easy to decipher as Enigma-encrypted messages are today.

BRIEF DESCRIPTION OF THE DRAWINGS

The description can be more fully understood with reference to the following figures and data graphs, which are presented as various embodiments of the disclosure and should not be construed as a complete recitation of the scope of the disclosure, wherein.

DETAILED DESCRIPTION

Figure 1:
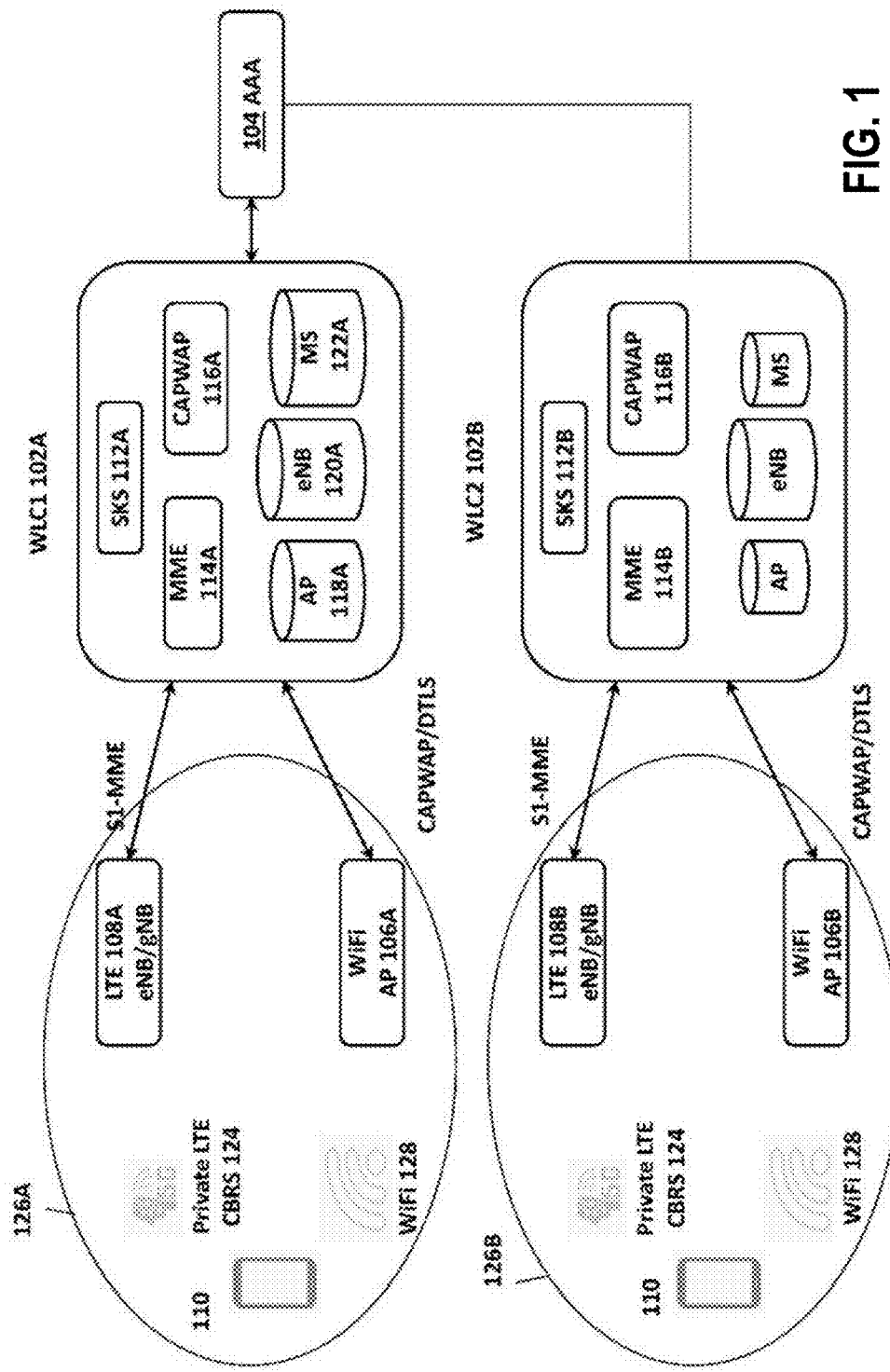
FIG. 1 is a system diagram showing interworking between Private LTE and WiFi, in accordance with some aspects of the disclosed technology.

The disclosure may be understood by reference to the following detailed description, taken in conjunction with the drawings as described below. It is noted that, for purposes of illustrative clarity, certain elements in various drawings may not be drawn to scale.

ACRONYMS

IMSI: International Mobile Subscriber Identity
GSM: Global System for Mobile Communications
UMTS: Universal Mobile Telecommunications System
AP: Access Point
WLC: Wireless LAN Controller
EPC: Evolved Packet Core
UE: User Equipment
PLMN: Public Land Mobile Network
eNB: eNodeB or Evolved Node B in 4G
gNB: gNodeB in 5G
QKD: Quantum Key Distribution
SKS: Session Key Service
GUTI: Globally Unique Temporary Identifier
KASME: Key Access Security Management Entries CBRS: Citizens Broadband Radio Service
SIM: Subscriber Identity Module
EPS: Evolved Packet System
AKA: Authentication and Key Agreement
RRC: Radio Resource Control
E-UTRAN: Evolved UMTS Terrestrial Radio Access Network
HSS: Home Subscriber Server
LTE: Long Term Evolution
PQPSK: post-quantum pre-shared key
PQSEED: Post-Quantum Common Secret Seed
PMK: Pairwise Master Key
MSK: Master Session Key
NAS: Network-attached storage
AS: Access Security
MME: Mobile Management Entities
WPA: WiFi Protected Access
EAP: Extendible Authentication Protocol
AAA: Authentication, Authorization, and Accounting
IKE: Internet Key Exchange
TLS: Transport Layer Security Introduction A Session Key Service (SKS), is an interface between an encrypting router and an external device (possibly 3rd party) that allows an encrypter to fetch a secret key that can be combined into session keys established by IKE or TLS or similar protocols. Each encrypter is co-located with a key provider device. These devices are synchronized so that the devices can provide identical session keys to each side of an IKE or TLS session. The SKS allows Cisco devices to be used with quantum key distribution (QKD) devices, or with other third-party systems that use conventional cryptography.

SKS offers pre-shared key generation with post-quantum security, but SKS does not solve the key distribution problem. A post-quantum secure key distribution system for an SKS has been developed to use conventional symmetric cryptography in a ratcheting manner. While this scheme is an attractive way to provide post-quantum security in products, because it does not have the range, bitrate, and physical layer limitations as the QKD has, the symmetric ratchet requires that an initial seed key be installed on each of the SKS key provider devices.

SKS provides interface between encrypting device (such as router) and an external device (possible 3rd party or Quantum Key Distribution device), which allows the encrypter to fetch a secret key that can be combined into the session keys to establish the secure tunnel. For public-key encryption, the algorithms based on RSA and Elliptic Curve Cryptography (ECC) may be broken by quantum computers. Code-based cryptography has been studied since 1978 and has withstood attacks very well, including attacks using quantum computers. McEliece with binary Goppa codes using length n=6960, dimension k=5413 and adding t=119 errors is thought to be safe. McEliece has not been used much yet because of the compute power needed to generate keys and their sheer size (millions of bits). Rekeying McEliece is too expensive.

Symmetric systems are usually not affected by Shor's algorithm, but are affected by Grover's algorithm. Under a Grover's attack, the best security a key of length n can offer is $2^{n/2}$, so AES-128 offers only $2^{64}$ post-quantum security. AES-256 is recommended, but comes with the shortcomings described earlier.

Many key exchange mechanisms are in use today, but are not believed to be post quantum secure, because symmetric encryption is immune to cryptanalysis from quantum computers.

Pre-shared secret keys are harder to deploy than public keys, yet there has been a renewed interest in pre-shared secret keys because of the need to deploy post-quantum secure cryptography. There are several reasons for difficult deployment of the pre-shared secret keys. First, managing a pool of secret keys shared between different locations is challenging. Second, when a pre-shared secret key is compromised, it is difficult to determine that a compromise has occurred, and this creates a security breach unless the key can be refreshed. Finally, it can be difficult to refresh and change the pre-shared secret keys.

QKD is a way to distribute commonly shared secrets which can be leveraged to drive the same AES key on both endpoints. However, QKD requires additional fiber and has distance imitations of 100 Km. Furthermore, it is not well-suited for a large scale WAN deployment with numerous sites which are not likely to be well-served by fiber optic or are simply too far away.

Efforts have been made to provide interworking functionality between enterprise Wireless (e.g. WiFi6/WiFi7) and 5G (e.g. Private LTE/CBRS), along with considering elimination of entities, such as EPC except small portion of MME for keeping the UE and eNB/gNB facing interface intact, which are not required for the enterprise architectures. It is critical to provide authentication and encryption functionality when WiFi and Private LTE functions are co-located (i.e. when providing access to a common network/set of service) as in the case of enterprise deployments.

Along with security, with the nature of wireless client (UE), roaming or re-associating/latching to another AP (WiFi) is very common. With the enterprise type of deployments, roaming across AP (WiFi) or across eNB/gNB (Private LTE) or from AP to eNB/gNB are common scenarios. However, there are no quantum resistant methods for UE roaming/latching across MMEs/WLCs.

It is critical to provide authentication and encryption functionality when WiFi and Private LTE functions are co-located (i.e. when providing access to a common network/set of service) as in the case of enterprise deployments. Conventionally all vendors are focusing on approach to have two sets of mobility, authentication, policy functions across Private LTE and WiFi. Each encrypter is co-located with a key provider device and those devices are synchronized so that they can provide identical session keys for each side of the tunnel.

Conventionally, AP communicates securely with the WLC over CAPWAP/DTLS tunnel. When AP and WLC establish a communication channel using a CAPWAP/DTLS protocol, they do mutual authentication across network based on certificate, public key infrastructure. However, public key (asymmetric encryption) algorithms are not immune to cryptanalysis from quantum computers. The CAPWAP/DTLS tunnel between WLC and AP also uses a PKI infrastructure, which suffers cryptanalysis attacks (using quantum computers).

It is also difficult to manage a pool of secret keys (i.e. in this case, one for each AP) deployed across different locations. When a key is compromised, it is hard to find the compromised key and it creates a security breach unless/until the key can be refreshed. It is also difficult to refresh and change the pre-shared secrets.

Conventionally, a BGP session uses TCP-MD5 and TCP-AO methods for providing message authenticity and integrity which required pre-shared keys. There are methods in which BGP can use PKI based security mechanisms (IKE/IPSec) to provide data confidentiality, but suffers from cryptanalysis attacks by quantum computing using Shor's or Grover's algorithms.

The DNS is the heart and soul of the internet. The DNS service is one of the most popular services. There are multiple security mechanisms to protect against DNS attacks. One security mechanism includes a DNS URL ACL feature on Switches and Wireless LAN Controllers (WLCs), which is used to restrict access to the websites by maintaining blacklist and whitelist of URLs. Conventional DNSCrypt operations are based on PKI methods and are vulnerable to cryptanalysis attacks by quantum computing using Shor's or Grover's algorithms.

There are many requirements or challenges with respect to clustering such as inter-twining of cluster management with the managed cluster business services on application-server, extensibility and visibility of cluster operations, and secure communication between devices in the cluster among others. Secure communication between cluster devices is one of the main requirements to achieve the remaining aspects of clustering.

Service provider customers can use pre-shared keys. However, it is always a challenge to maintain and distribute pre-shared keys. The disclosure provides solutions to distribute quantum secure keys in various protocols and technologies.

Overview

The disclosure provides quantum resistant roaming across APs/eNBs/gNBs in enterprise deployment with co-located Private LTE and WiFi. A quantum resistant method is provided for supporting user equipment (UE) roaming across APs/eNBs/gNBs belonging to various Wireless LAN Controllers (WLCs) in enterprise 5G and WiFi co-located deployments. The method may include initializing a SKS server in an electrical communication with a master WLC with a random post-quantum common secret seed (PQ-SEED) to generate a post-quantum pre-shared key (PQPSK) and a respective PQPSK-ID. The method may also include sending an encrypted PQSEED along with a PQPSK-ID to a second WLC. The method may further include joining AP (WiFi) to the master WLC using a CAPWAP/DTLS protocol. The method may further include sending the PQPSK-ID from the master WLC to the UE in an EAP success packet when the UE is associated with the AP (WiFi).

The disclosure also provides a system including one or more processors and a non-transitory computer readable medium comprising instructions stored therein, the instructions, when executed by the one or more processors, cause the processors perform operations which include initializing a SKS server in an electrical communication with a master WLC with a random post-quantum common secret seed (PQSEED) to generate a post-quantum pre-shared key (PQPSK) and a respective PQPSK-ID, sending an encrypted PQSEED along with a PQPSK-ID to a second WLC, joining AP (WiFi) to the master WLC using a CAPWAP/DTLS protocol, and sending the PQPSK-ID from the master WLC to the UE in an EAP success packet when the UE is associated with the AP (WiFi).

The disclosure also provides a non-transitory computer readable medium comprising instructions, the instructions, when executed by a computing system, cause the computing system to perform operations including initializing a SKS server in an electrical communication with a master WLC with a random post-quantum common secret seed (PQ-SEED) to generate a post-quantum pre-shared key (PQPSK) and a respective PQPSK-ID, sending an encrypted PQSEED along with a PQPSK-ID to a second WLC, joining AP (WiFi) to the master WLC using a CAPWAP/DTLS protocol, and sending the PQPSK-ID from the master WLC to the UE in an EAP success packet when the UE is associated with the AP (WiFi).

The disclosure also provides quantum resistant key generation and exchange for the Private LTE when both WiFi and Private LTE functions are co-located (e.g. on WLC). A method for distribution of a post-quantum pre-shared key (PQPSK) is provided for a private LTE. The method may include receiving an association request from a UE using UE network capability, Integrity Algorithm, Encryption Algorithm at a WLC using an EAP method. The method may also include sending Radius Access Request (LTEuserID, UE Network Capability) from the WLC to an AAA server, wherein the AAA server has a user profile including IMSI and WiFi identity. The method may also include receiving Radius Access Challenge from the AAA server. The method may also include sending an EAP association response from the WLC to the UE to complete EAP authentication. The method may also include initializing a SKS server in electrical communication with the WLC (i.e. authenticator) based upon a random post-quantum common secret seed (PQSEED) to generate a PQPSK (key, ID) pair including a PQPSK_ID. The method may also include sending the PQPSK_ID along with encrypted PQSEED using a MSK of the WLC to the UE.

The disclosure also provides quantum resistant CAPWAP tunnels between the WLC and the AP in large enterprise WiFi deployments or wireless LAN deployments. The disclosed method provides authentication to the PQPSK-ID shared between the Key Server (WLC) and the Non-Key Server (AP).

The disclosed method also establishes a quantum resistant SXP connection between Speaker and Listener, by extending the SXP protocol to allow Speaker (which acts as a Key Server) to distribute PQPSK-ID to Listener (which is a Non-Key Server). Subsequently, Speaker and Listener use the PQPSK-ID to get the same PQPSK from their local SKS servers, which are also referred to as Quantum Key Sources (QKSs). The PQPSK can be used as "Password" (for TCP-MD5) or "Key-Chain" (for TCP-AO) for establishing a quantum secure SXP connection.

The disclosed method establishes a quantum resistant BGP session between BGP peers (also referred to as BGP Speakers), by extending the BGP protocol to allow one of the BGP Speakers (with the highest Router ID/BGP identifier, acts as a Key Server) to distribute post-quantum identifier (PQPSK-ID) to another BGP peer. The disclosed method provides BGP payload encryption with the use of PQPSK (data confidentiality). Subsequently, one of the Speakers (which acts as a Key Server) and one of the BGP peers (which acts as a Non-Key Server) use the PQPSK-ID to get the same post-quantum pre-shared key (PQPSK) from the SKS, which can be used as "md5-key" for TCP-MD5 or "Key-Chain" for TCP-AO for establishing a secure BGP session.

The disclosure provides a quantum resistant secure DNS packet exchange in Umbrella/OpenDNS deployments, which is applicable for SD-WAN and SIG (Secure Internet Gateway) deployments, by using a DNSCrypt protocol. The disclosed method exchanges quantum resistant pre-shared keys between Umbrella Server and Switch/WLC, by using special DNS Query and Response packets to allow Umbrella Server (which acts as a Key Server) to distribute post-quantum symmetric keys to the Switch/WLC which can be used to encrypt the DNS traffic.

The disclosure also provides a quantum resistant mechanism to establish a quantum secure connection between Master and Worker devices in SDWAN cluster deployments, which also includes quantum secure distribution of pre-shared keys among cluster devices. The disclosed method provides authentication to the PQPSK-ID shared between a Key Server (e.g. Master vManage device) and a Non-Key Server (e.g. Worker vManage device), and uses the Master vManage device to distribute post-quantum identifier (PQPSK-ID) to the Worker vManage device.

A method is provided for distribution of a post-quantum pre-shared key (PQPSK) from a Key Server to a Non-Key Server. The method may include establishing a common secret seed between a Key Server and a Non-Key Server using a quantum secure cryptographic key. The method may also include initializing a first local SKS server in electrical communication to the Key Server to generate PQPSK key and PQPSK-ID. The method may also include adding a signature to the PQPSK-ID to generate a signed PQPSK-ID by the Key Server. The method may also include sending the signed PQPSK-ID from the Key Server to the Non-Key Server, wherein the signature of the signed PQPSK-ID is validated using a public key of the Key Server by the Non-Key Server, wherein a PQPSK key corresponding to the signed PQPSK-ID is requested by the Non-Key Server from a second local SKS server. The method may also include establishing a post quantum secure connection between the Key Server and the Non-Key Server, wherein the Key Server and the Non-Key Server share the same PQPSK key.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

Detailed Description of Example Embodiments

Quantum Resistant UE Roaming across Enterprise 5G Deployment (Private LTE Co-located with WiFi)

Enterprise 5G deployments (AKA Private LTE deployments operating in CBRS and other bands) are based on the same back-end core service as a traditional LTE, where a subscriber's access to a packet core service through 3GPP defined Evolved Packet Core (EPC). For enterprise architectures, most of features defined by 3GPP service-oriented architecture are not relevant. Also, enterprise 5G should interwork with existing WiFi deployments.

There are conventional methods in which authentication and encryption keys required for the LTE security are generated when the wireless client (UE) is connected to the WiFi with WLAN/SSID configured for 802.1X/EAP authentication method. In other words, the wireless client (UE) does a single 802.1X/EAP authentication to the network over WiFi, during that time, both the network and the wireless client (UE) generate the keys required for both WiFi access and the Private LTE, i.e. a "Single Authentication" (i.e. it avoids or eliminates LTE authentication procedure if it is already authenticated when the wireless client (UE) is connected over WiFi). The conventional method for deriving WiFi and LTE keys cannot be considered as quantum secure until deriving the WiFi and LTE keys using Post-Quantum (PQ) key exchange methods.

The wireless client (UE) can associate to WiFi network (e.g., AP1) of one WLC (e.g., WLC1) roam/latch on the Private LTD network (e.g., eNB/gNB) of another WLC (e.g., WLC2), where all WLCs in the deployments are in a mobility group. To handle such scenarios, the generated keys may be distributed across the mobility group members (similar to existing PMK cache distribution). However, there are security issues for sending keys across members and also performance issues for expensive database replication with such approaches. Hence, synchronizing database across WLCs should be over a secure connection. In particular, it should be over quantum resistant tunnels.

Post-Quantum Cryptography (PQC) is critical for mobile security in quantum era. The disclosure provides quantum resistant methods for 5G deployments and provide methods for quantum resistant roaming across APs/eNBs/gNBs in enterprise deployment with co-located Private LTE and WiFi. The disclosure also provides quantum resistant methods to support UE roaming/latching across APs/eNBs/gNBs that belongs to different WLCs in enterprise 5G (Private LTE/CBRS) and WiFi co-located deployments. The quantum resistant key generation, derivation, and distribution for Private LTE as inclusion of roaming would increase the complexity. Also, UE roaming includes multiple devices (i.e. different APs, eNBs, and even WLCs).

The disclosure provides quantum resistant methods to handle UE roaming across the multiple devices or entities (i.e. different APs, eNBs, and even WLCs) in an efficient way, e.g. seamless roaming of wireless clients (UEs) across WiFi and Private LTE networks in enterprise 5G deployment. The disclosure provides extensions to WiFi Access Authentication for Private-LTE Key Generation and IMSI Privacy Protection. The disclosure provides quantum resistant methods for 5G deployments, in particular, quantum resistant roaming across APs/eNBs/gNBs in enterprise deployment with co-located Private LTE and WiFi. The UE roaming/latching across APs/eNBs/gNBs may belong to different WLCs/MMEs in enterprise 5G (Private LTE/CBRS) and WiFi co-located deployments.

The disclosed method generates Private LTE keys and distributes the Private LTE keys along with UE roaming across WLC/MME. The disclosed method also distributes quantum resistant keys for Private LTE (Enterprise 5G) along with Privacy, which is a known threat in LTE access. In particular, the method also considers IMSI privacy using PQPSK-ID to make the system complaint to GDPR regulation.

Different deployments include Enterprise 5G (Private LTE interworking with WiFi, or Private LTE and WiFi co-located deployment), Private LTE access (CBRS) deployments (i.e. co-located Private LTE and WiFi deployments), SDA fabric in enterprise 5G, among others. The quantum resistant method supports wireless client (UE) roaming between AP and eNB/gNB and between eNBs/gNBs of different WLC/MMEs in enterprise 5G deployment with co-located WiFi and Private LTE.

3GPP TS 33.401 specifies LTE security architecture. An EPS AKA procedure is used for authentication and key agreement over E-UTRAN. In the USIM of UE and in a network (HSS), a permanent key and IMSI are pre-provisioned, and are used to generate KASME (root key), which is then used to generate other keys. The EPS AKA procedure includes the following steps: (1) HSS with the subscriber profile and SIM credentials, generates EPS authentication vectors (RAND, AUTN, XRES, KASME); (2) HSS sends them to MME; (3) MME selects one of the authentication vectors and uses it for mutual authentication with the UE and shares the same authentication key; and (4) Once the KASME is generated, the network and UE derive other keys (e.g., KNAS_Integrity, KNAS_Encryption, KeNB, KRRC_Integrity, KRRC_Encryption and KUP_Encryption), each with a different usage scope, i.e. between the UE and eNB/gNB, between the UE and MME.

FIG. 1 is a system diagram showing interworking between Private LTE and WiFi, in accordance with some aspects of the disclosed technology. As shown, a master WLC 102A includes a SKS server 112A, a MME 114A, a memory stored with CAPWAP protocol 116A, an AP interface 118A, an eNB/gNB interface 120A, and a MS 122A. MS stands for Mobile Station (in WiFi terms) and is also called as UE (User Equipment) (in LTE/5G terms). MS/UE may include laptops, desktops, mobile phones, or smart phones, or any device supporting WiFi and/or 4G LTE or 5G support. The MMC 114A or MME1 (WLC 102A) is in an electrical communication with LTE eNB/gNB 108A over S1-MME. The WLC 102A is also in an electrical communication with an AP (WiFi) 106A using CAPWAP/DTLS. The WLC 102A is also in an electrical communication with AAA server 104. Note that the LTE eNB/gNB 108A and AP (WiFi) 106A are co-located in a region 126A illustrated using a circle. The WLC 102A may be a master WLC and is in an electrical communication with other WLCs, e.g. WLC 102B or WLC2.

Another WLC (WLC2) 102B includes a SKS server 112B, a MME 114B, a memory stored with CAPWAP protocol 116B, an AP interface 118B, an eNB/gNB interface 120B, and a MS 122B. The WLC2 is also in an electrical communication with the AAA server 104, like WLC1 does.

A wireless client (UE) 110 may be in an electrical communication with the AP (WiFi) 106A through WiFi 128. The wireless client (UE) 110 may also be in an electrical communication with the LTE eNB/gNB 108A through Private LTE CBRS 124. When the wireless client (UE) 110 roams to a region 126B of WLC2, WLC2 is in an electrical communication with LTE eNB/gNB 108B through Private LTE CBRS 124.

Private LTE control plane (viz., MME) functions can be co-located with the WiFi control plane functions (for example, in WLC). There is interworking between these two functions. As shown in FIG. 1, LTE eNB/gNB 108B and AP (WiFi) 106B are co-located in the region 126B illustrated using a circle. WLC2 is also in an electrical communication with AP (WiFi) 106B through WiFi 128.

It will be appreciated by those skilled in the art that many WLCs or members like WLC2 or WLC 102B in the mobility group can be in an electrical communication with the AAA server 104 like WLC2 does.

It will be appreciated by those skilled in the art that many LTE eNB/gNBs may be within the circle 126A in communications with the MME1 114A (WLC1 102A), or within the circle 126B in communications with the WLC2 102B.

It will be appreciated by those skilled in the art that many APs may be within the circle 126A in communications with the WLC1 102A, or within the circle 126B in communications with the WLC2 102B.

The SKS servers 112A-B may be used to generate quantum resistant keys (Post-Quantum Pre-Shared Keys). In some variations, other methods such as QKD or any of the standard PQC can be used as a replacement for SKS for providing Quantum Security to 5G deployments.

All the members or MMEs/WLCs in the mobility group can be initialized or configured with a common secret seed value. The common secret seed value is then used to initialize the local SKS instance or SKS server 112A. Once the SKS server is initialized with the same secret seed value, the SKS server 112A generates a unique pair of Post-Quantum Pre-Shared Key (PQPSK Key) and Post-Quantum Pre-Share Key ID (PQPSK-ID). The SKS server 112A returns the same PQPSK Key if a corresponding PQPSK-ID is passed to the SKS server 112A. Similarly, the SKS server 112B for the WLC2 102B functions the same as the SKS server 112A for the Master WLC 102A.

The steps involved in the disclosed method can be divided into two phases. In Phase-1, all the WLCs in a mobility group initialize SKS with common seed for Mobility across WLCs/MMEs. As part of manufacturing, private and public keys are generated on WLCs using a quantum secure algorithm such as McEliece algorithm. This is a one-time process. A manufacturing team generates private and public keys using the same root CA (e.g., through PKI). These generated keys are stored in SUDI/ACT2 chip on the WLCs. Public keys (Root CA certificate chain) are bundled as part of the code written onto each chip. McEliece's Public keys can also be exchanged between the WLCs over the secure connection, to support third party certificates.

In Phase-1, one WLC establishes a secure connection with another WLC using CAPWAP/DTLS protocol. One of the WLCs (e.g. Master WLC or WLC1) in the mobility group acts as a Key Server and other WLCs (e.g. WLC2) act as Non-Key Servers. The Master WLC generates a random secret seed value and encrypts the secret seed using another WLC's public key. The secret seed value can be common for all WLCs. The Master WLC transmits the encrypted secret seed value to all other WLCs. Other WLCs decrypt the secret seed using their private keys. Now all WLCs have a common secret seed. All the WLCs initialize their local SKS instances or SKS servers with the common seed secret exchanged as above.

In some variations, the secret seed value may be configured on all the members of the mobility group manually, so that the above steps can be avoided.

Figure 2:
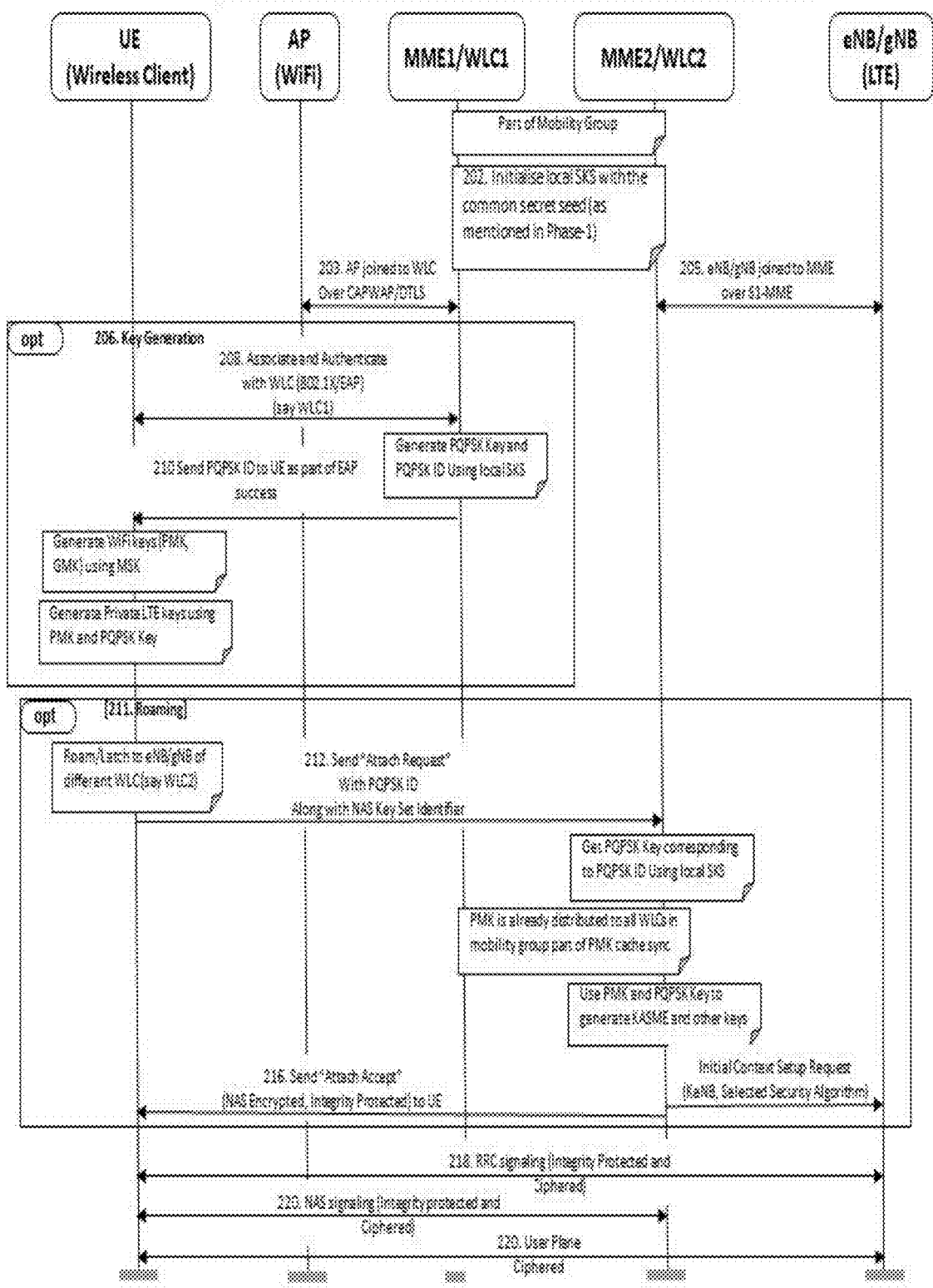
FIG. 2 is a sequence diagram depicting operations for quantum resistant UE roaming across enterprise 5G deployments, in accordance with some aspects of the disclosed technology.

Phase-2 includes UE roam/latch to Private LTE, across WLCs in a mobility group. FIG. 2 is a sequence diagram depicting operations for quantum resistant UE roaming across enterprise 5G deployments, in accordance with some aspects of the disclosed technology. As mentioned in Phase-1, all WLCs/MMEs in the mobility group initialize their local SKS servers with a common secret seed at 202, as shown in FIG. 2.

At 204, AP 106A joins to the WLC1 or WLC 102A over CAPWAP/DTLS. At 205, eNB/gNB 108A joins to the MME1 or MME 114A over S-1 MME.

Whenever the wireless client (UE) is in the coverage scope of enterprise WiFi (with 802.1x/EAP), WLC would authenticate and generate keys for both WiFi and Private LTE.

At 206, key generation starts. At 208, the MME1/WLC1 associates and authenticates with the wireless client (UE) 110 using 802.1x/EAP. The master WLC 102A or WLC1 also generates PQPSK-ID, which is shared with the UE as part of an EAP success. Subsequently, when the UE 110 roams and comes in coverage of Private LTE network (eNB/gNB) of the same MME/WLC (e.g. WLC1) or a different MME/WLC (WLC2), the UE 110 sends the PQPSK-ID in the "Attach Request" to the MME1/WLC1.

The MME1/WLC1 gets the PQPSK Key corresponding to PQPSK-ID from the local SKS server 112A and PMK from the "PMK cache" available on the WLC1. Note that PMK of a wireless client is replicated/distributed across mobility members (WLCs) as part of "PMK Cache sync." The MME1/WLC1 uses the PMK and PQPSK key to generate KASME. The MME1/WLC1 uses the KASME to generate other keys for [NAS, AS, eNB/gNB] (i.e. KNAS_Integrity, NKAS_Encryption, KeNB, KRRC_Integrity, KRRC_Encryption, KUP_Encryption).

The UE 110 generates WiFi keys (PMK, GMK) using the MSK. The UE 110 also generates Private LTE keys using the PMK and PQPSK key. Specifically, the UE generates KASME (32 octets) using MSK and PQPSK key as follows: KASME=AES_CMAC (MSK, PQPSK, PLTE_NID]. Here: MSK is derived at the UE during EAP authentication phase (e.g., uses DH method). PQPSK is generated by the local SKS using PQPSK ID. PLTE_NID is the Network Identifier of the Private LTE network that the UE's profile is configured with (PLTE_NID=PLMN+CBRS NID). The generated KASME is used for NAS and AS setup. The UE has these keys during its initial association.

In the disclosed method, PQPSK Key, KASME and other keys for [NAS, AS, enB/gNB] are not distributed across WLCs/MMEs in the mobility group. In other words, these keys are generated upon UE roaming only. Hence, there is no need to replicate/sync these keys across the devices (WLCs/MMEs), which improves the efficiency.

Once the local SKS servers are initialized with the same secret seed, the SKS server of each of WLCs generates a unique pair of PQPSK Key and PQPSK-ID. The PQPSK-ID is generated by the WLC (e.g., WLC1), upon wireless client association, and is shared or sent to the wireless client (UE) in an EAP success packet (when wireless client is associated with WLAN) at 210.

Whenever a wireless client (UE) roams to another eNB/gNB of the same WLC (e.g. WLC1), LTE keys can be generated by the UE using PQPSK-ID and can be used to avoid/skip the Private LTE authentication and key exchange phase.

Similarly, whenever the wireless client (UE) roam/latch to another eNB/gNB 108B of a different WLC 102B or WLC2 over Private LTE (CBRS) at 211, the UE 110 sends the PQPSK-ID in LTE "Attach Request" to the new WLC 102B (e.g. WLC2) at 212. The WLC2 gets the PQPSK-ID present in the "Attach Request" from the UE and uses this PQPSK-ID to get the corresponding PQPSK Key from the local SKS server. The PQPSK Key along with a PMK is used to generate KASME (root-key), which is then used to generate integrity and security keys required for the Private LTE session.

At 214, WLC2 sends an "initial Setup Request" (KeNB, Selected Security Algorithm) to eNB/gNB (LTE) 108B.

At 216, WLC2 sends the "Attach Accept" to the UE inside "S1AP: Initial Context Setup" which has KeNB keys for eNB/gNB and selected Integrity and Cipher algorithms. eNB/gNB generates its own keys, including KRRC_integrity, KRRC_encryption, KUP_encryption using KeNB keys and network selected Integrity and Cipher algorithms.

At 218, RRC signaling between the UE and eNB/gNB is protected by Integrity and Encryption. At 220, NAS signaling between the UE and MME/WLC is also protected by Integrity and Encryption. At 222, User Plane data between the UE and eNB/gNB, is protected by Encryption (ciphered).

Figure 3:
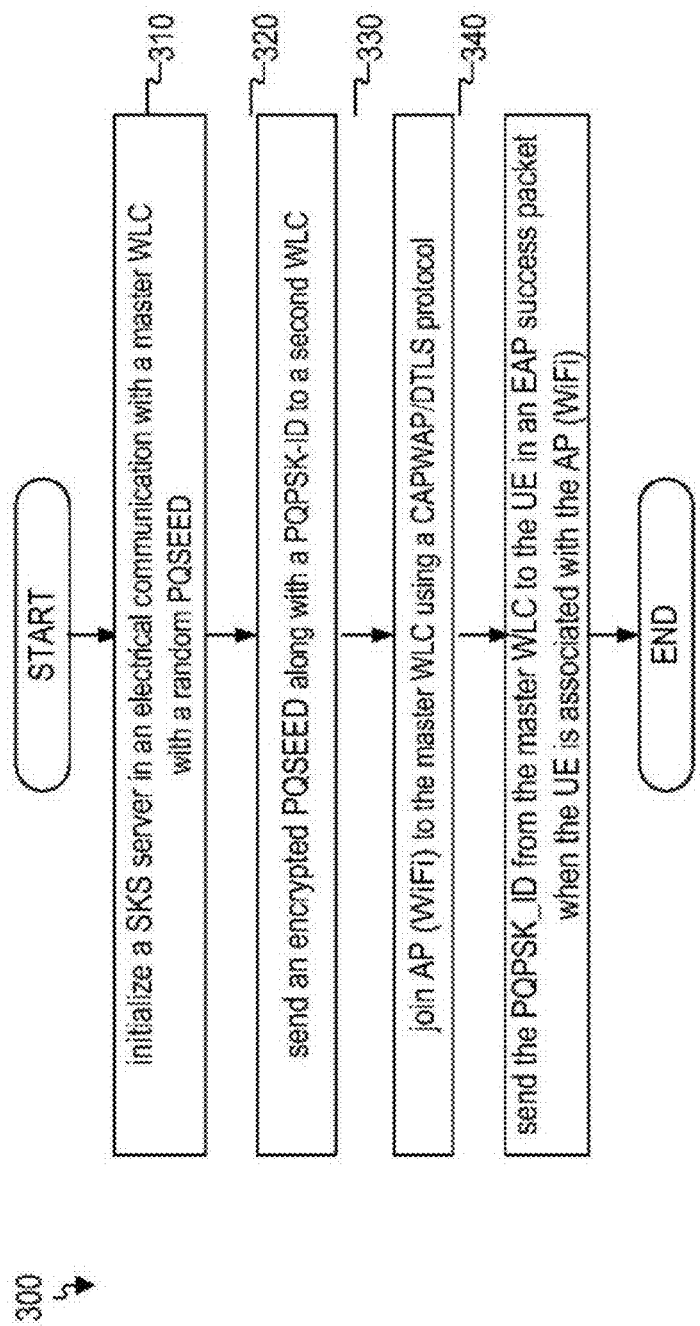
FIG. 3 is an example flow chart for quantum resistant UE roaming across enterprise 5G deployments, in accordance with some aspects of the disclosed technology.

FIG. 3 is an example flow chart for quantum resistant UE roaming across enterprise 5G deployments, in accordance with some aspects of the disclosed technology. Although an example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes initializing a SKS server in an electrical communication with a master WLC with a random post-quantum common secret seed to generate a PQPSK key and a respective PQPSK-ID at block 310. For example, a master WLC (WLC1) 102A as illustrated in FIG. 1 may initialize a SKS server 112 in an electrical communication with the master WLC 102A with a random post-quantum common secret seed to generate a PQPSK key and a respective PQPSK-ID.

In some variations, the master WLC generates the PQSEED having a one-time PQSEED value for initializing the SKS server in an electrical communication with the WLC.

According to some examples, the method 300 includes sending an encrypted PQSEED along with a PQPSK-ID to a second WLC to establish a quantum secure connection with the second WLC at block 320. For example, the master WLC 102A as illustrated in FIG. 1 may send an encrypted PQSEED along with a PQPSK-ID to another WLC 102B or WLC2 to establish a quantum secure connection with the WLC2.

In some variations, the master WLC encrypts the PQSEED using a public key of the second WLC to generate the encrypted PQSEED.

In some variations, the second WLC decrypts the encrypted PQSEED using a private key of the second WLC.

In some variations, the decrypted PQSEED initializes a second SKS server in an electrical communication with the second WLC to obtain a respective PQPSK to the PQPSK-ID.

According to some examples, the method 300 includes joining AP to the master WLC using a CAPWAP/DTLS protocol at block 330. For example, the AP 106 as illustrated in FIG. 1 may join to the master WLC 102A by using a CAPWAP/DTLS protocol.

According to some examples, the method 300 includes sending the PQPSK-ID from the master WLC to the UE in an EAP success packet when the UE is associated with the AP at block 340. For example, the master WLC 102A as illustrated in FIG. 1 may send the PQPSK-ID to the UE 110 in an EAP success packet when the UE 110 is associated with the AP 106.

In some variations, the method may include receiving "Attach Request" from the UE using PQPSK-ID along NAS key set identifier and generating KASME using the PQPSK with the PMK. For example, the WLC2 or WLC 102B as illustrated in FIG. 1 may receive "Attach Request" from the UE 110 with PQPSK-ID along with NAS key set identifier, and may generate KASME by using the PQPSK with the PMK, where the PMK is already distributed to all WLCs in the mobile group part of PMK cache sync. The method may also include sending Initial Context Setup Request to the eNB/gNB. For example, the WLC2 or WLC 102B as illustrated in FIG. 1 may send Initial Context Setup Request to the eNB/gNB 108. The method may further include sending "Attach Accept" to the UE at block 370. For example, the WLC2 or WLC 102B as illustrated in FIG. 1 may send "Attach Accept" to the UE 110.

In some variations, the UE generates WiFi keys (PMK, GMK) using MSK.

In some variations, the UE generates LTE keys using the PMK and PQPSK.

In some variations, the eNB/gNB joins to one of second WLCs (e.g. WLC2) over 51-MME when the UE roams to the one of the second WLCs.

In some variations, the MME/WLC generates integrity and security keys for a Private LTE session using the KASME.

In some variations, the Initial Context Setup has KeNB keys for eNB/gNB and selected Integrity and Cipher algorithms.

In some variations, the eNB/gNB generates KRRC_integrity, KRRC_encryption, KUP_encryption using the KeNB keys.

In some variations, a RRC signaling between the UE and the eNB/gNB is protected by Integrity and Encryption.

In some variations, a NAS signaling between the UE and MME/WLC is protected by Integrity and Encryption.

In some variations, a User Plane data between the UE and the eNB/gNB is protected by Encryption (ciphered).

Quantum resistant Key Distribution for Private LTE (Enterprise 5G) along with Privacy It is critical to provide authentication and encryption functionality when WiFi and Private LTE functions are co-located (i.e. when providing access to a common network/set of service) as in the case of enterprise deployments. Conventionally all vendors are focusing on approach to have two sets of mobility, authentication, policy functions across Private LTE and The disclosure provides quantum resistant way of key generation/distribution in Private LTE deployments. The disclosure provides quantum resistant key distribution or generation for enterprise 5G (CBRS) with co-located Private LTE and enterprise WiFi deployments, when wireless client (UE) is already authenticated with WiFi using 802.1X/EAP methods. The disclosure provides methods for quantum resistant Private LTE key distribution or generation for enterprise 5G with co-located Private LTE and WiFi deployment along with providing "a Single Authentication" and IMSI privacy to make the system compliant to GDPR regulation. The methods provide quantum resistant security for Private LTE access (CBRS) deployments, i.e. co-located Private LTE and WiFi deployments. The disclosed method may reduce database replication.

The disclosure provides a quantum resistant key exchange method to generate PQPSK, which is used to derive keys for integrity protection and encryption for Private LTE. The disclosure considers quantum resistant key exchange methods or post-quantum cryptography for generating Private LTE keys along with a single authentication in enterprise WiFi and Private LTE deployments.

The disclosed method skips the entire LTE authentication steps, by leveraging on MSK and PQPSK key from the WiFi authentication (802.1x/EAP method) phase for generating quantum resistant LTE keys. The SKS server can be initialized with the common secret seed value to generate a pair of PQPSK (Key, ID). WLC generates a one-time random secret seed value, e.g. Post Quantum Seed (PQSEED) and uses this PQSEED to initialize local SKS instance or server and also sends the PQSEED to the UE as part of EAP success.

Whenever the wireless client (UE) (with a "single-authentication" support) is in the coverage of enterprise WiFi, the UE would authenticate with the WLC and the AAA server using an 802.1X/EAP method. During this phase, the WLC generates PQPSK-ID for the UE from its local SKS instance and sends the PQPSK-ID to the UE along with an encrypted PQSEED using MSK as part of an EAP success.

Then, the UE completes the authentication process and generates WiFi Keys (PMK, GMK). Additionally, the UE decrypts the PQSEED using the MSK and initializes its local SKS instance. The UE uses the PQPSK-ID to generate the corresponding PQPSK key from its local SKS instance. Later, the UE uses the PQPSK key along with the MSK to generate a LTE root key e.g. KASME.

Subsequently, when the UE comes in coverage of Private LTE network or radio, the UE does the "Attach Request" and skips the entire LTE authentication procedure. In other words, the UE uses the PQPSK-ID received from the LTE network, when the UE has been associated to the WiFi, and the UE presents the PQPSK-ID in the "Attach Request" of LTE. Also, the MME/WLC generates the KASME from the MSK and PQPSK key. Then, the MME/WLC generates other keys for [NAS, AS, eNB/gNB] (i.e. KNAS_Integrity, NKAS_Encryption, KeNB, KRRC_Integrity, KRRC_Encryption, KUP_Encryption) by using the KASME.

Figure 4:
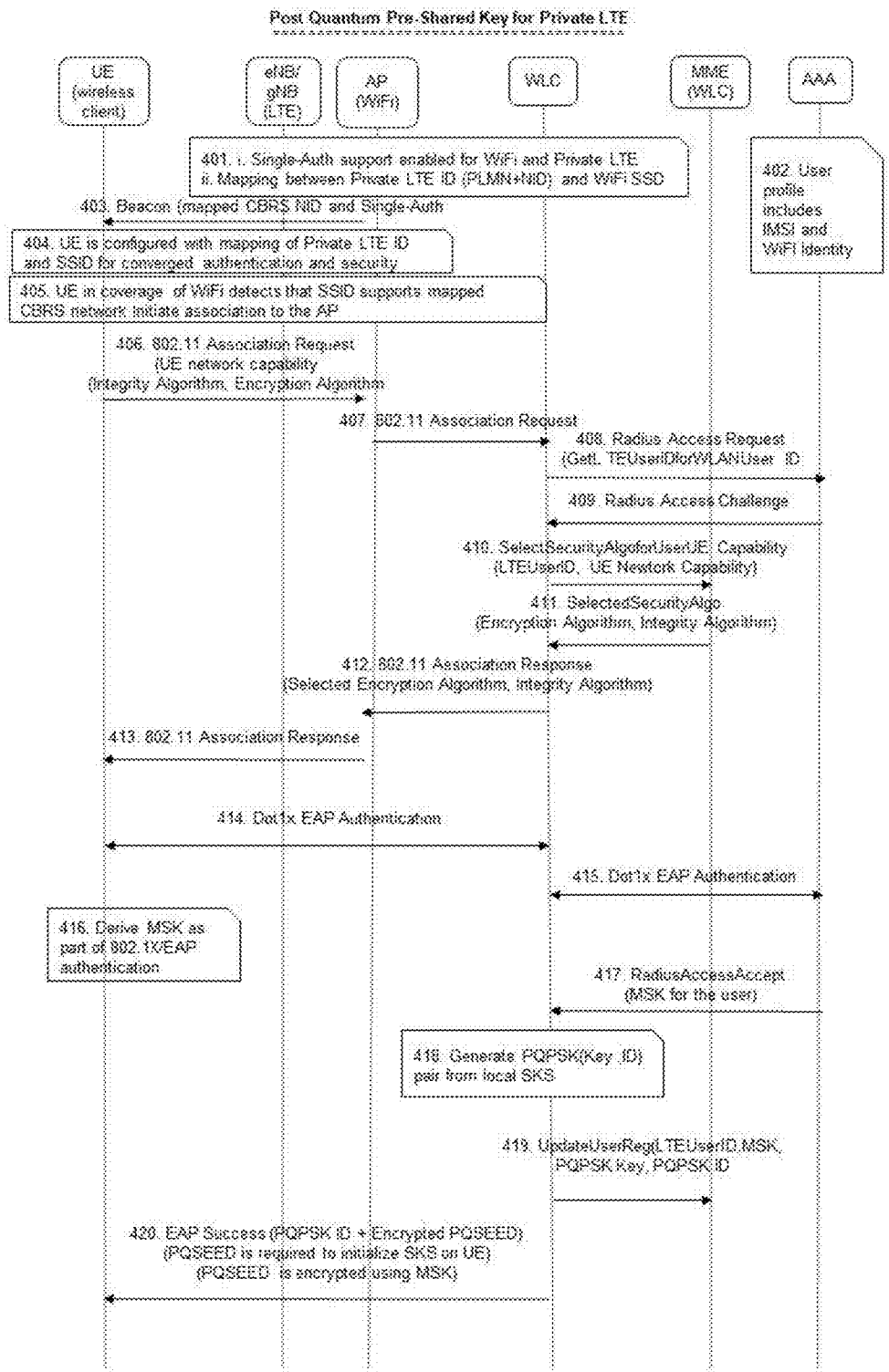
FIG. 4 is a sequence diagram depicting operations for quantum resistant key distribution for Private LTE (enterprise 5G) along with IMSI privacy, in accordance with some aspects of the disclosed technology.
Figure 4:
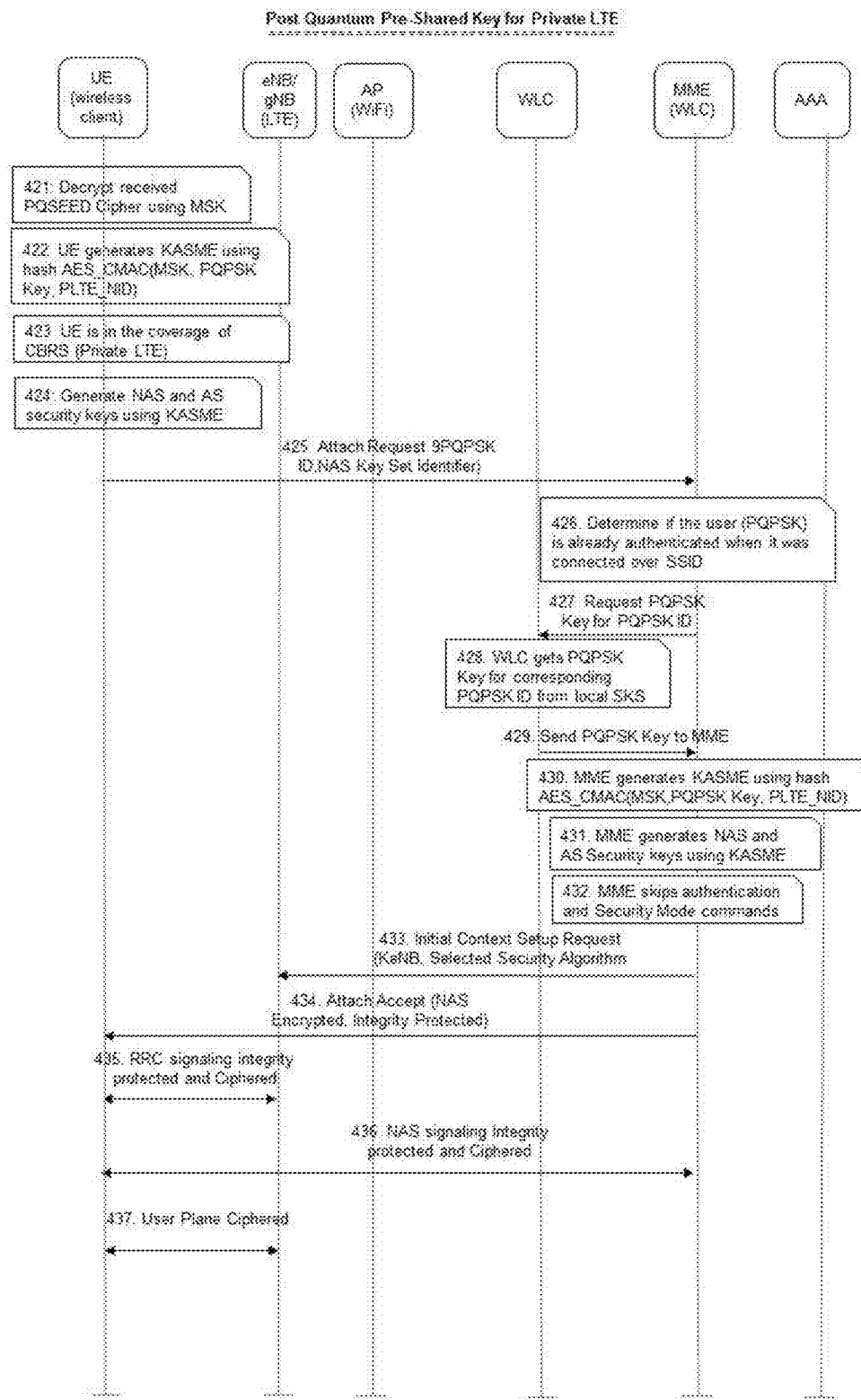

FIG. 4 is a sequence diagram depicting operations for quantum resistant key distribution for Private LTE (enterprise 5G) along with IMSI privacy, in accordance with some aspects of the disclosed technology. The steps in FIG. 4 are explained in two phases, i.e. Phase-1 and Phase-2.

Phase-1 includes initializing SKS server with a random secret seed value. The WLC (e.g. WLC1), as shown in FIG. 1, generates the random secret seed value, i.e. PQSEED (Post Quantum SEED), which is a one-time process, upon boot up of the WLC. The WLC initializes the local SKS server with the PQSEED. The local SKS sever generates a unique pair of PQPSK key and PQPSK-ID. The WLC sends an encrypted PQSEED using MSK along with PQPSK-ID to the UE 110, as shown in FIG. 1.

At 401, a single authentication is enabled for WiFi and Private LTE mapping between Private LTE network ID (PLMN ID along with NID value) and WiFi SSID. The UE 110 and the LTE network (e.g. LTE 108A) are pre-configured for the "Single Authentication" support, along with mapping between the WiFi identity (ID) and Private LTE network identity (ID), i.e. for every WLAN/SSID of the WiFi (e.g. AP 106A), the corresponding Private LTE network ID (i.e. CBRS PLMN ID along with NID value) is pre-configured to avoid any new security threats. Changes may be required to the UE's WiFi authentication procedure.

At 402, a user or subscriber's profile in the AAA server 104 for the enterprise users, as shown in FIG. 1, includes both WiFi identify and IMSI, where IMSI is associated with the Private LTE, and the WiFi identify (e.g. SSID) is the identity used for WiFi authentication. The Private LTE is also referred to as LTE network, or Private LTE network.

At 403, WiFi sends Beacon (mapped CBRS NID and single authentication) to the UE. At 404, the UE is configured with mapping of Private LTE ID and SSID for authentication and security. At 405, the UE in coverage of WiFi detects that SSID supports mapped CBRS network and initiates association to the AP 106A, as shown in FIG. 1.

Phase-2 includes generating authentication and encryption keys for the Private LTE.

At 406, the UE sends an "802.11 Association Request (UE network capability, integrity algorithm, Encrypted Algorithm" to the AP. Then, at 407, the AP sends the "802.11 Association Request (UE network capability, integrity algorithm, Encrypted Algorithm" to the WLC. At 408, the WLC sends a "Radius Access Request (Get LTE User ID for WLAN User ID)" to the AAA server. At 409, the AAA server sends a "Radius Access Challenge" to the WLC. At 410, the WLC sends "Select Security Algorithm for User or UE Capability (LTE User ID, UE network Capability)" to the MME (WLC). At 411, the MME (WLC) sends "Select Security Algorithm for User UE Capability (selected Encrypted Algorithm, integrity Algorithm)" to the WLC. At 412, the WLC sends an 802.11 Associate Response (selected Encrypted Algorithm, integrity Algorithm) to the AP. Then, at 413, the AP sends the 802.11 Associate Response (selected Encrypted Algorithm, integrity Algorithm) to the UE.

At 414, the UE and the WLC have Dot1x EAP authentication. At 415, the WLC and the AAA server have Dot1x EAP authentication. The wireless client (UE) is authenticated with the WLC by 802.1x/EAP based methods using the AAA server, as illustrated in FIG. 1, where the WLC is the Authenticator, the UE is the Supplicant, and the AAA server is the Authentication server.

MSK is generated for both the WLC and the UE. At 416, the MSK is derived at the UE. If 802.1X/EAP security is used, the MSK is derived during EAP authentication phase. If WPA/WPA2-PSK security is used, the MSK is derived from the PSK. At 417, for 802.1X/EAP, the MSK would be shared by the AAA server with the WLC (e.g. authenticator) in a Radius Access Accept packet, where the MSK is generated by the AAA server during EAP authentication phase. For WPA/WPA2-PSK, the MSK is generated by the WLC from the pre-configured PSK.

The WLC acts as a Key Server and generates PQPSK-ID from its local SKS server. At 418, the WLC (Key Server) requests its local SKS server to generate a pair of PQPSK key and PQPSK-ID. At 419, the WLC sends updated User Request (LTE User ID, MSK, PQPSK key, PQPSK-ID) to the MME (WLC). At 420, as part of EAP success, the WLC sends the PQPSK-ID along with encrypted PQSEED (which is encrypted using MSK) to the wireless client (UE). Note that only PQPSK-ID is sent in EAP success and the PQPSK Key is not sent. The PQPSK-ID is used for initializing the local SKS server of the UE.

At 421, the UE decrypts received PQSEED Cipher using MSK. At 422, the wireless client (UE) generates Key Access Security Management Entries (KASME) using MSK and PQPSK for the Private LTE access (CBRS), as below:

$$KASME = AES\_CMAC(MSK, PQPSK, PLTE\_NID)$$

The MSK is derived at UE during EAP authentication phase (e.g. uses DH method). PQPSK is generated by the local SKS of the UE using the PQPSK-ID. PLTE_NID is the Network Identifier of the Private LTE network that the UE profile is configured with (PLTE_NID=PLMN+CBRS NID). The KASME can be used for generating LTE keys for NAS and AS setups by the MME/WLC.

For the WiFi access (through WLAN/SSID), both the wireless client (UE) and the WLC generate PMK using MSK. The WLC also generates Group Master Key (GMK). For securing the WiFi access using PMK, existing methods are used.

At 423, when the UE comes in coverage of Private LTE network.

At 424, the UE generates NAS and AS security keys using KASME for NAS and AS setups for Private LTE. The Private LTE keys are the same as NAS and AS security keys. The Private LTE keys are the keys generated for NAS and AS setup as explained below. The UE uses KASME and Network provided Integrity and Encryption algorithms to proceed with NAS and AS security setup as below. The NAS security setup includes generating KNAS_Integrity and KNAS_Encryption keys as below:

$$KNAS\_Integrity = KDF(KASME, NAS\_Integrity\_Algorithm, Algorithm\_ID)$$

$$KNAS\_Encryption = KDF(KASME, NAS\_Encryption\_Algorithm, Algorithm\_ID)$$

The AS Security Setup includes generating KeNB keys and then generating KRRC_Integrity, KRRC_Encryption and KUP_Encryption keys as below, i.e.

generating KeNB keys using KASME and NAS count from USIM, generating KRRC_Integrity using the KeNB keys and Network Selected RRC Cipher algorithm where KRRC_Integrity=KDF (KeNB, RRC_Integrity_Algorithm, Algorithm_ID), generating KRRC_Encryption using the KeNB keys and Network Selected RRC Cipher algorithm where KRRC_Encryption=KDF (KeNB, RRC_Encryption_Algorithm, Algorithm_ID), and generating KUP_Encryption using KeNB and Networked User Place Cipher algorithm where KUP_Encryption=KDF (KeNB, User_Plane_Encryption_Algorithm, Algorithm_ID)

When the UE 110 comes in coverage 126A of the Private LTE network 108A, at 425, the UE sends an initial "Attach Request" with PQPSK-ID to the MME(WLC) or MME/WLC along with an indicator [NAS Key Set Identifier] as the UE already has generated NAS and AS security keys, so that the LTE network 108A can skip the authentication and security mode [NAS, AS] steps, but still all the communication with the LTE network can be protected by integrity and security (encryption) according to those keys.

At 426, the WLC validates the UE using [NAS Key Set Identifier] when the UE has been connected over SSID or associated with WiFi access. If validation is successful, then the MME/WLC generates the Integrity and security (encryption) keys for the UE independently. At 427, the MME/WLC sends request for a corresponding PQPSK key for the PQPSK-ID. At 428, the WLC gets the PQPSK key from its local SKS server using the PQPSK-ID provided by the UE in the "Attach Request". At 429, the WLC sends the PQPSK key to the MME/WLC.

At 430, the MME generates KASME using hash AES_C-MAC (MSK, PQPSK key, PLTE_NID). At 431, the MME generates NAS and AS security keys using KASME. At 432, the MME skips authentication and Security Mode commands.

At 433, the MME/WLC sends "Initial Context Setup Request (KeNB, Selected Security Algorithm) to LTE eNB/gNB, which is also referred to as eNB/gNB, LTE, LTE network, Private LTE, or eNB/gNB (LTE) in the disclosure. The "Initial Context Setup Request" has KeNB keys for the LTE eNB/gNB and selected Integrity and Cipher algorithms.

At 434, the WLC sends "Attach Accept (NAS Encrypted, Integrity Protected)" to the UE. Here, RRC Security Mode command is bypassed. LTE eNB/gNB generates its own keys, including KRRC_Integrity, KRRC_Encryption, KUP_Encryption using the KeNB keys and the MME selected Integrity and Cipher algorithms (viz., RRC Cipher algorithm, RRC Integrity algorithm, User Plane Cipher algorithm).

At 435, a RRC signaling between UE and eNB/gNB is protected by Integrity and Encryption. At 436, a NAS signaling between the UE and the MME/WLC is protected by Integrity and Encryption. At 437, a User Plane data between UE and eNB/gNB, is protected by Encryption (ciphered).

IMSI Privacy Protection is achieved as described below. PQPSK-ID populated by the SKS/WLC, during a WLAN EAP authentication phase and sent to the UE from the WLC in an EAP success. The UE uses this PQPSK-ID in LTE "Attach Request". Thus, IMSI is never shared and makes the LTE network secure. As such, the disclosed method prevents IMSI exposure, which is a known threat in LTE access. The method also makes the system compliant to GDPR regulation.

Figure 5:
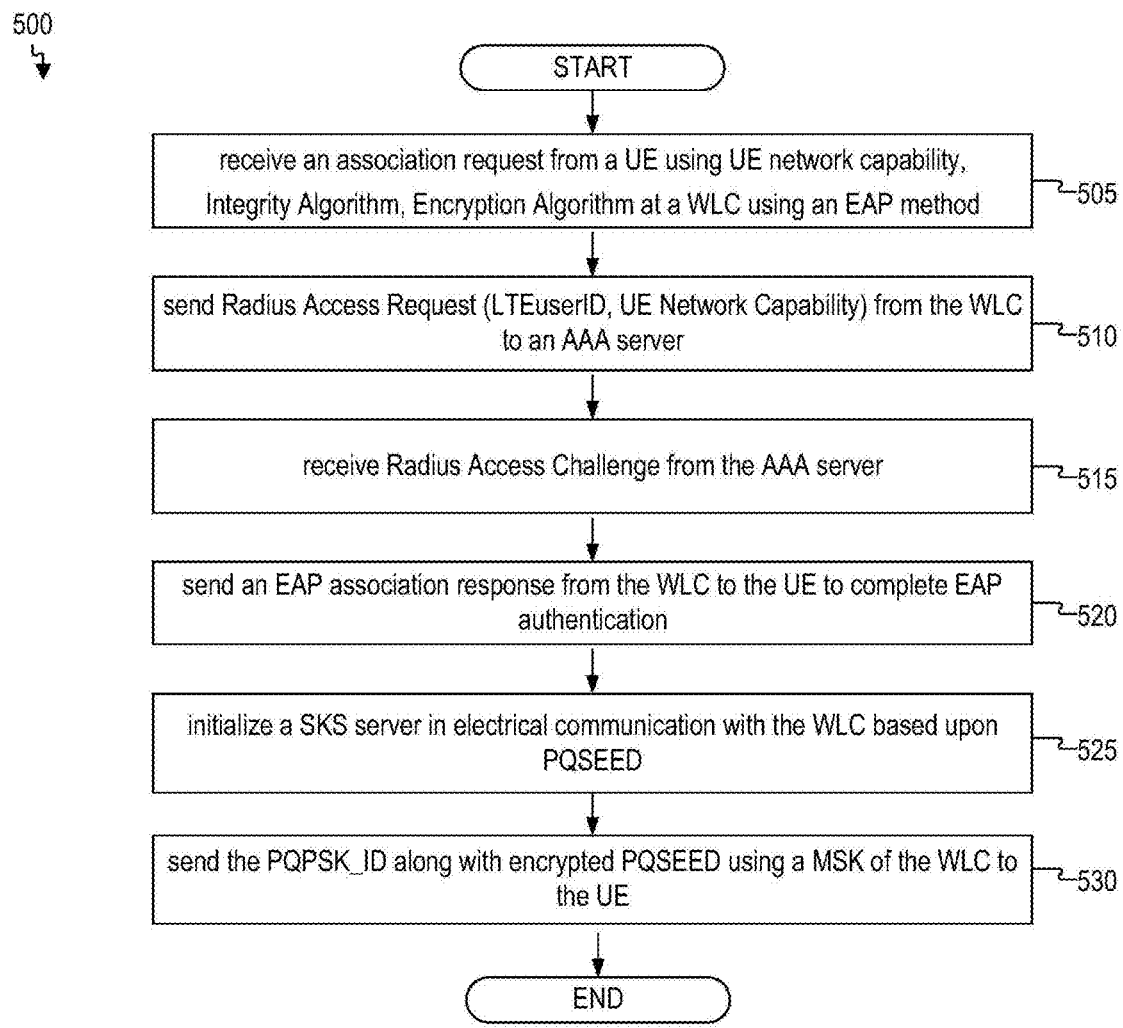
FIG. 5 is an example flow chart for quantum resistant key distribution for Private LTE (enterprise 5G) along with privacy, in accordance with some aspects of the disclosed technology.

FIG. 5 is an example flow chart for quantum resistant key distribution for Private LTE (enterprise 5G) along with privacy, in accordance with some aspects of the disclosed technology. Although an example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes receiving an association request from a UE using UE network capability, Integrity Algorithm, Encryption Algorithm at a WLC using an EAP method at block 505. For example, the WLC 102A as illustrated in FIG. 1 may receive an association request from a UE 110 using UE network capability, Integrity Algorithm, Encryption Algorithm using an EAP method.

According to some examples, the method 500 includes sending Radius Access Request from the WLC to an AAA server at block 510. For example, the WLC 102A illustrated in FIG. 1 may send a "Radius Access Request" to the AAA server 104. The AAA server 104 has a user profile including IMSI and WiFi identity.

According to some examples, the method 500 includes receiving Radius Access Challenge from the AAA server at block 515. For example, the WLC 102A as illustrated in FIG. 1 may receive a "Radius Access Challenge" from the AAA server 104.

According to some examples, the method 500 includes sending an EAP association response from the WLC to the UE to complete EAP authentication at block 520. For example, the WLC 102A as illustrated in FIG. 1 may send an EAP association response to the UE 110 to complete the EAP authentication.

According to some examples, the method 500 includes initializing a SKS server in an electrical communication with the WLC based upon a random post-quantum common secret seed to generate a PQPSK pair including a PQPSK-ID at block 525. For example, the WLC 102A as illustrated in FIG. 1 may initialize a SKS server 112 in an electrical communication with the WLC 102A based upon a random post-quantum common secret seed to generate a PQPSK pair including a PQPSK-ID.

According to some examples, the method 500 includes sending the PQPSK-ID along with encrypted PQSEED using a MSK of the WLC to the UE at block 530. For example, the WLC 102A as illustrated in FIG. 1 may send the PQPSK-ID along with encrypted PQSEED using a MSK of the WLC 102A to the UE 110.

In some variations, the AAA generates the MSK of the WLC during EAP authentication phase and shares the MSK with the WLC in Radius Access Accept packet for 802.1X/EAP security. In some variations, the WLC generates the MSK of the WLC from a pre-configured PSK for WPA/WPA2-PSK security.

In some variations, the method 500 may include receiving an "Attach Request" from the UE using the PQPSK-ID along with a NAS key set identifier when the UE is in coverage of a Private LTE. For example, the WLC 102A as illustrated in FIG. XXX may receive from the UE 110 an "Attach Request" using the PQPSK-ID along with a NAS key set identifier when the UE 110 is in coverage of a Private LTE 108A.

In some variations, the method 500 may also include validating the UE using the NAS key set identifier by the WLC. For example, the MME 114 of the WLC 102A as illustrated in FIG. 1 may validate the UE 110 using the NAS key set identifier by the WLC 102A.

In some variations, the method 500 may also include generating integrity key and security key independently for the UE using a corresponding PQPSK to the PQPSK-ID from the UE by the WLC after the validating is successful. For example, the MME 114 of the WLC 102A as illustrated in FIG. 1 may generate integrity key and security key independently for the UE 110 using a corresponding PQPSK to the PQPSK-ID from the UE 110 after the validating is successful.

In some variations, the method 500 may also include sending Initial Context Setup having KeNB keys for the Private LTE and selected Integrity and Cipher algorithms from the MME/WLC to eNB/gNB of the Private LTE. For example, the MME 114 of the WLC 102A as illustrated in FIG. 1 may send Initial Context Setup have KeNB keys for the Private LTE and selected Integrity and Cipher algorithms to eNB/gNB 108A or Private LTE. The MME 114 generates KASME and then generates NAS and AS security keys using the KASME. The KeNB keys are generated by the MME/WLC using the integrity key and security key.

In some variations, the method 500 may also include sending an "Attach Accept" from the WLC to the Private LTE. For example, the MME 114 of the WLC 102A in FIG. 1 may send an "Attach Accept" to the Private LTE 108A.

In some variations, the method 500 may include sending a Selected Security Algorithm for user or UE capability including LTE user ID and UE network capability to the MME/WLC. For example, the WLC 102A as illustrated in FIG. 1 may send a Selected Security Algorithm for user or UE capability including LTE user ID and UE network capability to the MME 114 of the WLC 102A. The method 500 may include receiving a Selected Security Algorithm including Encryption Algorithm and integrity Algorithm from the MME/WLC. For example, the WLC as illustrated in FIG. 1 may receive a Selected Security Algorithm including Encryption Algorithm and integrity Algorithm from the MME 114 of the WLC 102A. The method 500 may also include sending the PQPSK-ID along with encrypted PQSEED using the MSK of the WLC and the selected Security Algorithm to an AP using the EAP method at block 570. For example, the WLC 102A as illustrated in FIG. 1 may send the PQPSK-ID along with encrypted PQSEED using the MSK of the WLC 102A and the selected Security Algorithm to the UE 110 using the EAP method.

In some variations, the WLC generates the PQSEED having a one-time random PQSEED value for initializing the SKS server in an electrical communication with the WLC.

In some variations, the NAS key set identifier is generated by the UE.

In some variations, the UE gets a corresponding PQPSK to the PQPSK-ID received from the WLC from a second SKS server in an electrical communication with the UE.

In some variations, the UE derives a MSK as part of EAP authentication for 802.1X/EAP security.

In some variations, the UE derives a MSK from a pre-configured PSK for WPA/WPA2-PSK security.

In some variations, the encrypted PQSEED is decrypted using the above derived MSK at the UE In some variations, the UE generates KASME based upon the derived MSK and the corresponding PQPSK for the Private LTE.

In some variations, the UE generates the NAS key set identifier from the KASME and uses the KASME and Network provided Integrity and Encryption algorithms to proceed with NAS security setup and AS security setup.

In some variations, the NAS security setup comprises generating KNAS_Integrity and KNAS_Encryption keys.

In some variations, the AS security setup comprises generating KeNB keys using KASME and NAS count from USIM.

In some variations, the AS security setup comprises generating KRRC_Integrity and KRRC_Encryption using the KeNB keys and Network Selected RRC Cipher algorithm.

In some variations, the AS security setup comprises generating KUP_Encryption keys using the KeNB keys and Networked User Place Cipher algorithm.

In some variations, the UE generates the integrity and security keys for a Private LTE session using the KASME.

In some variations, the NAS key set identifier includes NAS security key identifier and AS security key identifier.

In some variations, the eNB/gNB generates its own keys including KRRC_integrity, KRRC_encryption, KUP_encryption using the KeNB keys and MME selected Integrity and Cipher algorithms (viz., RRC Cipher algorithm, RRC Integrity algorithm, User Plane Cipher algorithm).

In some variations, RRC signaling between the UE and the eNB/gNB is protected by Integrity and Encryption.

In some variations, NAS signaling between the UE and MME/WLC is protected by Integrity and Encryption.

In some variations, User Plane data between the UE and the eNB/gNB is protected by Encryption (ciphered).

In some variations, the method prevents international Mobil Subscriber Identity (IMSI) exposure.

The following embodiments relate to WiFi access.

In some variations, the method 500 may further include sending a Selected Security Algorithm for user or UE capability including LTE user ID and UE network capability to MME/WLC. The method 500 may also include receiving a Selected Security Algorithm including Encryption Algorithm and integrity Algorithm from the MME/WLC. The method 500 may also include sending the PQPSK-ID along with encrypted PQSEED using the MSK of the WLC and the selected Security Algorithm to an AP using the EAP method.

In some variations, the UE generates PMK for securing the AP using the derived MSK of the UE.

In some variations, the WLC generates PMK and GMK using the MSK of the WLC.

In some variations, a single-authorization support enables for the AP (i.e. WiFi) and Private LTE mapping between a Private LTE ID (PLMN+NID) and a WiFi SSID.

In some variations, the UE is configured with mapping of the Private LTE ID and the WiFi SSID for converged authentication and security.

In some variations, the UE in coverage of the WiFi detects the WiFi SSID, supports mapped CBRS network, and initiates its association to the AP or WiFi.

Figure 6:
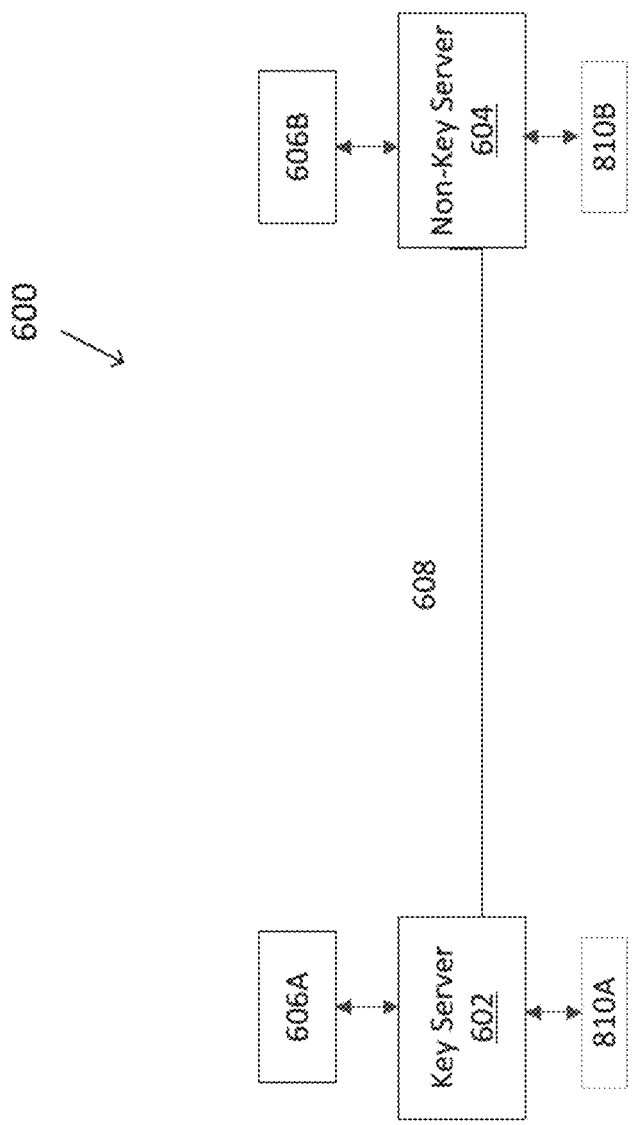
FIG. 6 is a system diagram showing a quantum secure communication between a Key Server and a Non-Key Server, in accordance with some aspects of the disclosed technology.

FIG. 6 is a system diagram showing a quantum secure communication between a Key Server and a Non-Key Server, in accordance with some aspects of the disclosed technology. As shown in FIG. 6, a system 600 includes a Key Server 602 and a Non-Key Server 604 having a quantum secure communication channel 608 in between.

The Key Server 602 is in an electrical communication with a first SKS server 606A. The Non-Key Server 604 is in an electrical communication with a second SKS server 606B.

Figure 7:
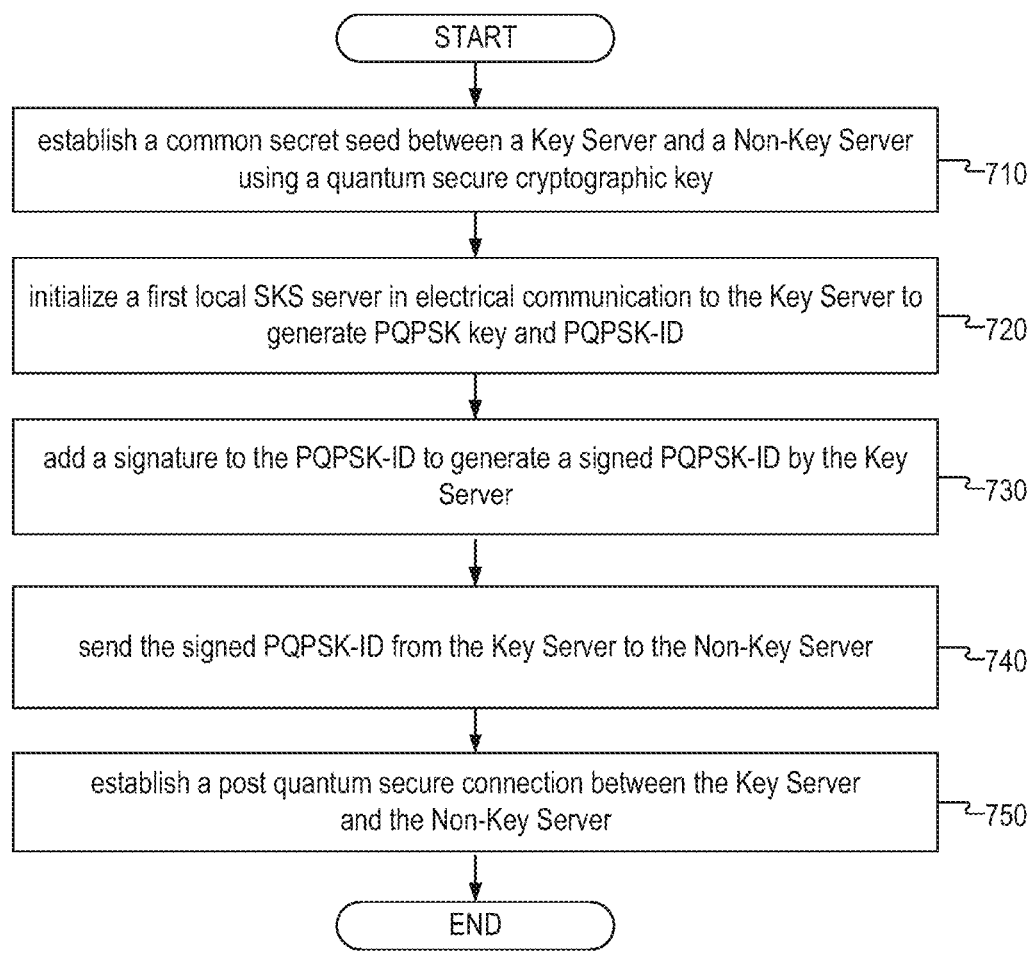
FIG. 7 is an example flow chart for establishing a quantum secure communication between a Key Server and a Non-Key Server, in accordance with some aspects of the disclosed technology.

FIG. 7 is an example flow chart for establishing a quantum secure communication between a Key Server and a Non-Key Server, in accordance with some aspects of the disclosed technology. Although an example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 includes establishing a common secret seed between a Key Server and a Non-Key Server using a quantum secure cryptographic key at block 710. For example, the Key Server 602 as illustrated in FIG. 6 may establish a common secret seed with the Non-Key Server 604 using a quantum secure cryptographic key.

According to some examples, the method 700 includes initializing a first local SKS server in an electrical communication to the Key Server to generate PQPSK key and PQPSK-ID at block 720. For example, the Key Server 602 as illustrated in FIG. 6 may initialize a first local SKS server 606A in an electrical communication to the Key Server 602 to generate PQPSK key and PQPSK-ID.

According to some examples, the method 700 may include adding a signature to the PQPSK-ID to generate a signed PQPSK-ID by the Key Server at block 730. For example, the Key Server 602 as illustrated in FIG. 6 may add a signature to the PQPSK-ID to generate a signed PQPSK-ID.

According to some examples, the method 700 may include sending the signed PQPSK-ID from the Key Server to the Non-Key Server at block 740. For example, the Key Server 602 as illustrated in FIG. 6 may send the signed PQPSK-ID to the Non-Key Server 604. The signature of the signed PQPSK-ID is validated using a public key of the Key Server 602 by the Non-Key Server 604. The Non-Key Server 604 request a PQPSK key corresponding to the signed PQPSK-ID from the second local SKS server 606B.

According to some examples, the method includes establishing a post quantum secure connection between the Key Server and the Non-Key Server at block 750. For example, the Key Server 602 as illustrated in FIG. 6 may establish a post quantum secure connection with the Non-Key Server 604. The Key Server 602 and the Non-Key Server 604 share the same PQPSK key.

In some variations, each of the first SKS service and the second SKS service is configured to generate the same PQPSK key and PQPSK-ID based upon the same common secret seed.

In some variations, the Key Server 602 may be a wireless LAN controller (WLC), and the Non-Key Server 604 may be one or more access points (APs), and the application is WiFi deployments. The method extends a CAPWAP/DTLS protocol to allow the WLC to distribute the PQPSK-ID to the one or more APs and establish quantum resistant secure tunnels in large scale deployments comprising WiFi, SDN, SD-WAN, and ISP.

In some variations, the Key Server 602 may be a Switch-1 selected as a Speaker, and the Non-Key Server 604 may be a Switch-2 selected as a Listener. The method extends a SXP protocol to allow the Speaker to distribute the PQPSK-ID to the Listener and establishes SGT exchange protocol (SXP) connections between the Speaker and the Listener.

In some variations, the Key Server 602 may be Router-1 having the highest Router ID/BGP identifier among all Routers, and the Non-Key Server 604 may be Router-2 or peer. The method extends border gateway protocol (BGP) protocol to allow Router-1 to distribute the PQPSK-ID to the peer and establishes post quantum secure border gateway protocol (BGP) session between Router-1 and the peer.

In some variations, the Key Server 602 may be one of Umbrella Server, Umbrella cloud, or OpenDNS Server, and the Non-Key Server 604 may be Switch/WLC. The method uses special DNS Query and Response Packet to allow the Umbrella/OpenDNS to distribute the PQPSK-ID to the Switch/WLC and establishes quantum resistant secure connection between the Umbrella/OpenDNS and the Switch/WLC.

In some variations, the Key Server 602 may be SDWAN Cluster Master, and the Non-Key Server 604 may be SDWAN worker devices. The method allows the SDWAN Cluster Master to distribute the PQPSK-ID to SDWAN worker devices and establishes quantum resistant secure communication between the SDWAN Cluster Master and the SDWAN worker devices in SDWAN cluster deployments.

Figure 8:
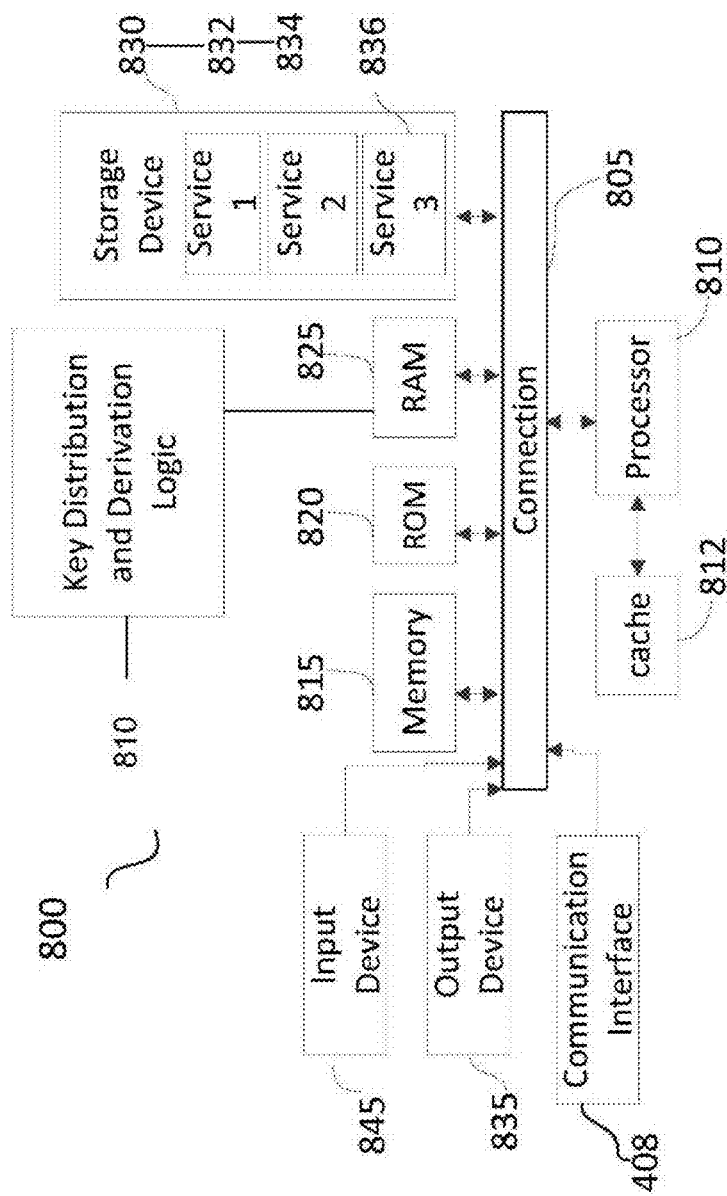
FIG. 8 shows an example device that executes key distribution and key derivation logic, in accordance with some aspects of the disclosed technology.

FIG. 8 shows an example device (e.g. WLC, MME, AAA server, or a controller for Private LTE, UE, Key Server, Non-Key Server, Master Device etc.) that executes key distribution and key derivation logic 810. It should be appreciated that FIG. 8 provides only an illustration of one embodiment and does not imply any limitations with regard to the environments in which different embodiments may be implemented. Many modifications to the depicted environment may be made. Indeed, in many implementations of a device configured to host key distribution and key derivation logic, much of the hardware described below may not be needed.

Device 800, which can be for example any computing device making up internal computing system, or remote computing system of the WLC 102, the MME 114, the AAA server 104, the UE 110, the Private LTE 108, the Key Server 602, the Non-Key Server 604, or any component thereof in which the components of the system are in an electrical communication with each other using connection 805. Connection 805 can be a physical connection via a bus, or a direct connection into processor 810, such as in a chipset architecture. Connection 805 can also be a virtual connection, networked connection, or logical connection.

In some embodiments, device 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Device 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, device 800 includes an input device 845, which can represent any number of input mechanisms, such as a microphone for speech, a touch-sensitive screen for gesture or graphical input, keyboard, mouse, motion input, speech, etc. Device 800 can also include output device 835, which can be one or more of a number of output mechanisms known to those of skill in the art. In some instances, multimodal systems can enable a user to provide multiple types of input/output to communicate with device 800. Device 800 can include communications interface 880, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

EXAMPLES

The following examples are for illustration purposes only. It can be apparent to those skilled in the art that many modifications, both to materials and methods, may be practiced without departing from the scope of the disclosure.

CAPWAP: Control and Provisioning of Wireless Access Points
DTLS: Datagram Transport Layer Security
CA: Certificate Authority
PKI: Public Key Infrastructure
ECDSA: Elliptic Curve Digital Signature Algorithm
ECC: Elleptic Curve Cryptography
RSA: Rivest-Shamir-Adleman
SGT: Security Group Tag
SXP: SGT Exchange Protocol
TPM: Trusted Platform Module
AO: Authentication Option
SK: Secret Key or Private Key
PK: Public Key
HKDF: HMAC Key Derivation Function
BGP: Border Gateway Protocol
DNS: Domain Name System, Domain Name Service, or Domain Name Server
EDNS: Extended DNS
FQDN: Fully Qualified Domain Name
SD-WAN: Software-Defined WAN
TLV: type-length-value or tag-length-value
MITM: Man-in-the-middle Attack
IPSec: IP Security
DDoS attack: distributed denial-of-service attack Example 1: Quantum Resistant CAPWAP Tunnels in WiFi Deployments The disclosure addresses the key distribution problem across large enterprise WiFi deployments or WiFi deployments. The disclosed method establishes quantum resistant CAPWAP/DTLS tunnels between WLC (which acts as Key Server) and AP (which acts as a Non-Key Server), by extending the CAPWAP/DTLS protocol to allow the WLC to distribute post-quantum identifier (PQPSK-ID) to the AP. Subsequently, the WLC and AP use the PQPSK-ID to get the same PQPSK from the SKS server, which can be used to derive DTLS keys for encryption/decryption of the traffic between the WLC and the AP.

The disclosed method is useful to provide quantum resistant secure tunnels in large scale deployments (such as WiFi, SDN, SD-WAN, ISP, etc.). The disclosed method also allows frequent key refresh with no administrative cost.

From a WiFi deployment point of view, the disclosure provides a quantum secure distribution of pre-shared keys between the WLC and the AP. There may be thousands of APs joined to the WLC. The secret seed and PQPSK-ID are exchanged in CAPWAP protocol specific TLVs. The Key Server or WLC adds a signature to the PQPSK-ID TLV while exchanging between the Key Server (WLC) and the Non-Key Server (AP) to provide authentication and hence to avoid DDoS attacks.

The AP needs to join to the WLC before the AP can serve the wireless clients. The AP communicates securely with the WLC over a CAPWAP/DTLS tunnel. When the AP and the WLC establish a quantum secure communication channel using the CAPWAP/DTLS protocol, the AP and the WLC do mutual authentication across network based on certificate and public key infrastructure.

In wireless LAN deployments, the WLC and the AP can have a certificate chain as part of image itself and does not need to exchange public keys. The wireless LAN deployments are cloud enabled, where the WLC is deployed at the public cloud and the AP are on-premises.

To avoid DDoS attack on the PQPSK-ID, the Key Server may include some authentication information along with the PQPSK-ID generated by the SKS, such as Attestation information including Canary stamp, hardware fingerprint among others. The authentication information may also include signature signed on the PQPSK-ID by the WLC using its private key (stored securely on SUDI/ACT2/TAM chip, which is tamper proof). The SKS server 606A of the Key Server 602 (WLC) generates a pair of PQPSK Key and PQPSK-ID, which is unique per Non-Key Server 604 (AP). The Key Server 602 (WLC) generates a signature by signing on PQPSK-ID using its private key and includes the signature as part of PQPSK-ID TLV. Then, this consolidated PQPSK-ID TLV is shared to the Non-Key Server 604 (AP), which validates the signature using the public key of WLC 602 before accepting the PQPSK-ID sent from the WLC 602.

A set of PQPSK TLVs are introduced to provide post-quantum security, including PQPSK Capability TLV for exchanging PQPSK capabilities to identify the ability for post-quantum security, PQPSK-ID Information TLV for sending PQPSK-ID from the WLC (Key Server) to the AP (Non-Key Server), and PQPSK-ID Status TLV for sending PQPSK-ID Status from the AP to the WLC.

In PQPSK Capability TLV, each of the WLC and the AP supports PQPSK and announces its capability as part of PQPSK capability TLV in CAPWAP (Discovery or Join request) messages. In one embodiment, the PQPSK Capabilities TLV may be defined in Table 1 as below:

TABLE 1

Post Quantum PSK (PQPSK) Capability TLV

| PQPSK Capability TLV Type = 200 (proposed) (1 byte) | Length of TLV information (1 byte) | PQPSK Implementation Capability (2 bytes) | MY_ID (4 bytes) |
|---|---|---|---|
| TLV Header | | TLV Information | |

| Parameter Type | Field Width (bytes) | Notes |
|---|---|---|
| PQPSK Capability Type | 1 | 0 - If PQPSK is not supported<br>1 - If PQPSK is supported and Mandatory<br>2 - If PQPSK is supported and optional<br>(in case of optional, the default behavior is fallback to existing traditional method, however, this can be controlled by local governance) |
| TLV Length | 1 | Length of TLV Information |
| PQPSK Implementation capability | 2 | What type of PQPSK implementation is supported (SKS/QKS, Post Quantum algorithms such as McEliece etc.) |
| MY_ID | 4 | My current in-use PQPSK ID |

Whenever the WLC or AP is configured to support PQPSK as mandatory, it can continue to drop the received CAPWAP messages from unsupported peers.

Distribution of PQPSK-ID information TLV (Type, Signature, PQPSK-ID, Checksum) (WLC→AP) is provided as follows. When both the WLC and the AP are PQPSK capable, then the WLC (Key Server) generates PQPSK-ID by its local SKS server and distributes the PQPSK-ID to the AP in PQPSK-ID TLV in CAPWAP (Discovery or Join Response) messages. The WLC continues to distribute the PQPSK-ID until the WLC receives a PQPSK-ID status from the AP or till the CAPWAP/DTLS PQPSK message timeout. If a PQPSK-ID status with "Reject" is received, the WLC regenerates the PQPSK-ID and distributes the PQPSK-ID again. By default PQPSK-ID, regeneration may be allowed twice (except the original distribution), which can be controlled by administrator's configuration or local governance. If consecutive PQPSK-IDs are rejected by the AP, the WLC falls back to a legacy DTLS connection (if PQPSK capability is "Supported and Optional"). To ensure that the WLC does not delay indefinitely by the PQPSK-ID status, after a PQPSK message timeout, the WLC falls back to the legacy DTLS connection.

In another embodiment, the PQPSK-ID Information TLV can be defined in Table 2 as below:

TABLE 2

Post Quantum PSK ID (PQPSK) TLV

| PQPSK Capability TLV Type = 201 (proposed) (1 byte) | Length of TLV information (1 byte) | ECDSA Signature (PQPSK) (32 bytes) | PQPSK ID (4 bytes) | Integrity (2 bytes) |
|---|---|---|---|---|
| TLV Header | | TLV Information | | |

| Parameter Type | Field Width (bytes) | Notes |
|---|---|---|
| PQPSK ID TYPE | 1 | To inform destination (here it is AP) that this TLV carries PQPSK ID from the Key Server (here it is WLC) |
| TLV Length | 1 | Length of TLV Information |
| Signature (PQPSK ID) | 32 | Sign on PQPSK ID with private key using ECDSA (Elliptic Curve Digital Signature Algorithm) and generate signature of size 32 bytes. |
| PQPSK ID | 4 | PQPSK ID generated by the SKS on the Key Server |
| Integrity value | 2 | Integrity of the PWPSK ID (derived from MD5sum or AES Key wrap) |

The TLV is sent from the AP to the WLC. When PQPSK-ID information TLV is received from the WLC containing PQPSK-ID that is "not known" or "is not available" for use by the AP, then the AP sends a PQPSK-ID Status TLV in the CAPWAP message (Discovery or Join Response) with a status as "Reject".

TABLE 3

| Post Quantum PSK ID (PQPSK) TLV | | |
|---|---|---|
| PQPSK ID Status TLV Type = 202 (proposed) (1 byte) | Length of TLV information (1 byte) | PQPSK ID Status Implementation Capability (1 bytes) |
| TLV Header | | TLV Information |

| Parameter Type | Field Width (bytes) | Notes |
|---|---|---|
| PQPSK ID Status | 1 | To inform destination (here it is WLC) that this TLV carries PQPSK ID Status from the Non Key Server (here it is AP) |
| TLV Length | 1 | Length of TLV Information |
| PQPSK ID Status | 1 | 0 - Reject<br>1 - Accept |

The method is divided into two phases as below. Phase-1 includes sharing secret seed value between the WLC and the AP. As part of manufacturing, private and public keys are generated on both the WLC and the AP using a quantum secure algorithm, such as McEliece algorithm. This is a one-time process. A manufacturing team generates the private and public keys using the same root CA (e.g. through PKI). These generated keys are stored in SUDI/ACT2 chip on the WLC and AP. The public keys (Root CA certificate chain) are bundle as part of image. The McEliece's public keys can also be exchanged between peers over the secure connection, to support third party certificates.

Phase-1 also includes that the AP establishes a secure connection with the WLC using the CAPWAP/DTLS protocol. The WLC generates a random secret seed value and encrypts the secret seed using AP's public key. This can be generated "one for each AP" or "common for all APs". The WLC transmits the encrypted secret seed value to the AP. The AP decrypts the seed using its private key. Now in Phase-1, the WLC and the AP have a common secret seed.

Phase-2 includes generating the same PQPSK key using SKS service. The SKS is a software entity implemented inside the WLC and AP. The WLC and AP use the local SKS severs to generate a pair of PQPSK Key and PQPSK-ID based on the common seed exchanged in Phase-1.

Figure 9:
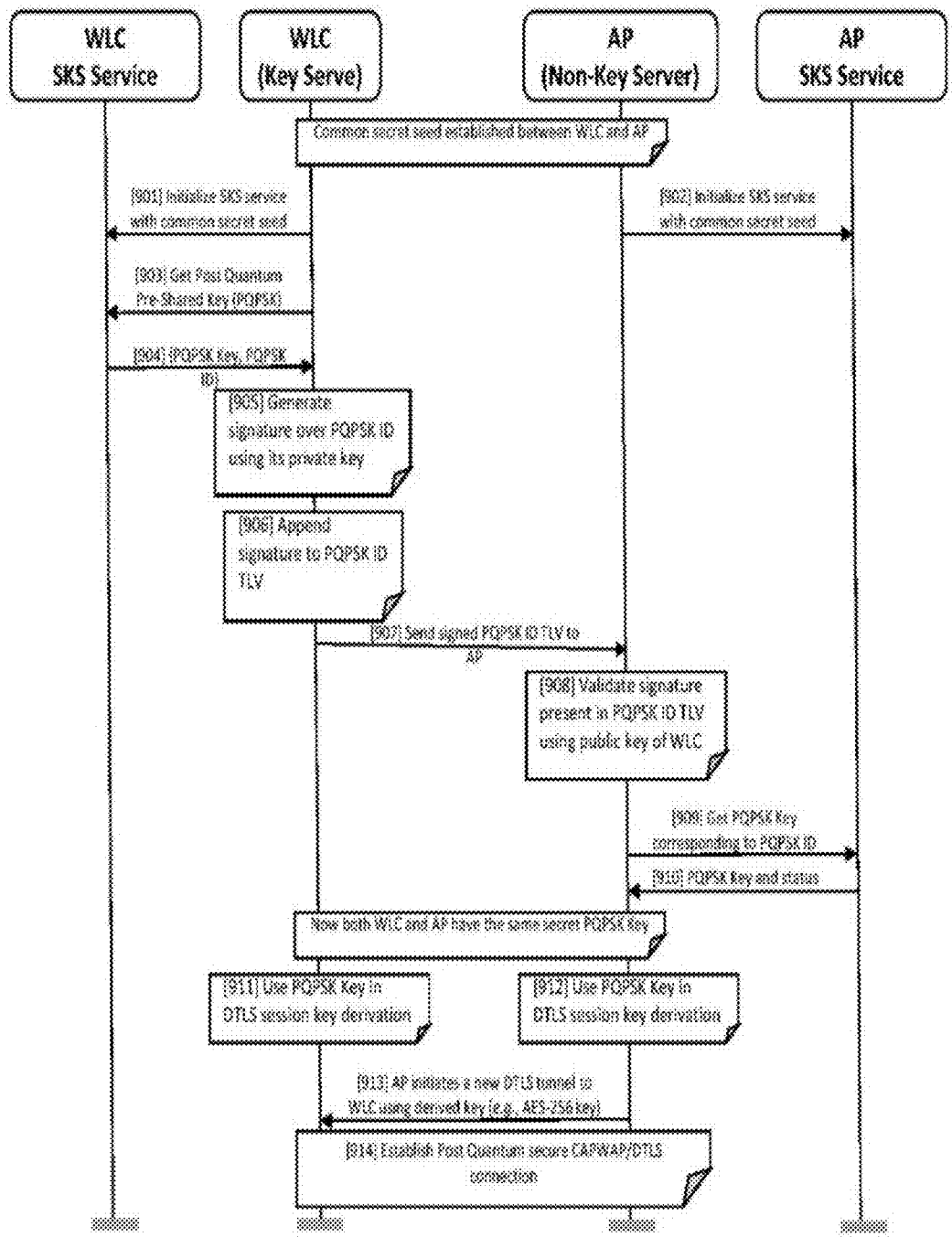
FIG. 9 is a sequence diagram depicting operations for post-quantum secure connection establishment between Wireless LAN Controller (WLC) and Access Point (AP) using Session Key Service (SKS), in accordance with some aspects of the disclosed technology.

FIG. 9 is a sequence diagram depicting operations for post-quantum secure connection establishment between WLC and AP using SKS, in accordance with some aspects of the disclosed technology. At 901, the WLC initializes its local SKS instance or service with the common seed secret exchanged in Phase-1. Then, at 903, the WLC requests its local SKS server or service to generate a PQPSK Key, and receives a pair of PQPSK Key and PQPSK-ID from the local SKS service at 904.

At 905, the WLC generates a signature over PQPSK-ID using its private key. At 906, the WLC appends the signature to the PQPSK ID TLV. At 907, the WLC sends signed PQPSK-ID TLV to the AP. At 908, the AP validates the signature present in PQPSK ID TLV using the public key of the WLC.

At 909, the AP requests its local SKS instance to fetch PQPSK Key corresponding to the PQPSK-ID received from the WLC. At 910, the AP receives the PQPSK key and status from its local SKS service. Since SKS instances of WLC and AP start with the same seed secret, the WLC and AP would have the same PQPSK Key.

At 911 and 912, the WLC and AP can use this to derive the DTLS key (e.g. AES-256 key), respectively, to establish DTLS connection. At 913, the AP initiates a new DTLS connection to WLC using above derived key. At 914, a post-quantum secure CAPWAP/DTLS connection is established between the WLC and the AP.

Anytime the WLC wants to refresh the DTLS key, the WLC and AP can run the above procedure. Hence, the WLC and AP can refresh their keys at will, without any administrative intervention, and without ever exhausting their shared keys.

Example 2: Quantum Resistant Keys Along with Auto Provisioning SXP Connections

Conventionally, a SGT Exchange Protocol (SXP) connection uses TCP-MD5 and TCP-AO methods for providing messages of authenticity and integrity which require pre-shared keys. There are methods in which SXP can use Dot1x for authentication and key exchange. There are methods in which SXP can use PKI based security mechanisms to provide data confidentiality, but suffers from cryptanalysis attacks by quantum computing using Shor's or Grover's algorithms.

SGT eXchange Protocol (SXP) is used to propagate Security Group Tag (SGT) information across the network devices. SGT provides software-defined segmentation and policy enforcement. SXP is included in the Open Daylight SDN controller, which allows other vendors to integrate at Controller level instead of network. Also, Open Source SXP implementation is available via Github, which allows other vendors to use for implementing in their own products (e.g., we use this in ISE 2.0). TrustSec uses SXP to advertise or propagate IP-to-SGT binding for platforms that do not support the native SGT capabilities.

The SXP connection is point-to-point and uses TCP as the underlying transport protocol with roles as Speaker (i.e. device that sends the IP-to-SGT binding), Listener (i.e. device that receives the IP-to-SGT binding), or both.

The SXP connection uses the following methods for providing message authenticity and integrity, including using TCP-MD5 that requires pre-configured key (password) on both sides of the point-to-point link and uses TCP-MD5 option with MD5 Digest, and also using TCP-AO that requires pre-configured key-chain on both sides of the point-to-point link and uses TCP-AO option with HMAC. In the above methods, user or administrator may configure the same pre-shared key on both the peer-devices and it is cumbersome if a large number of devices need to be configured in the deployment and manual configuration is error prone.

There are also methods in which SXP can use Dot1x with centralized AAA/Radius server for authentication and key exchange, which is a single point of failure. The above methods provide authenticity and integrity, where one needs manual configuration and another needs availability of centralized AAA server(s). There are also methods in which SXP can use PKI based security mechanisms to provide data confidentiality (encryption/decryption) along with authentication and integrity, but suffers from cryptanalysis attacks by quantum computing using Shor's or Grover's algorithms.

The disclosed method for key distribution is quantum resistant, decentralized in nature and does not need manual intervention. The method establishes quantum resistant SXP connection between Speaker and Listener, by extending SXP protocol to allow Speaker to distribute PQPSK-ID to Listener. Subsequently, Speaker and Listener use the negotiated PQPSK-ID to get the same post-quantum pre-shared key (PQPSK) from the SKS, which can be used as "Password" (for TCP-MD5) or "Key-Chain" (for TCP-AO) for establishing secure SXP connection.

The secret seed and PQPSK-ID are exchanged in SXP protocol specific TLVs. The method adds a signature to the PQPSK-ID TLV while exchanging between the Key Server (e.g. Speaker) and the Non-Key Server (e.g. Listener) to provide authentication to avoid DDoS attacks.

Existing configurations use "Password" (for TCP-MD5) or "Key-Chain" (for TCP-AO) for establishing SXP connection over TCP. Using this method, a user may manually configure the same secret (pre-shared key) on both the devices. The manual configuration would be error-prone and cannot scale with a large number of devices in the deployment. The SXP connection uses TCP-MD5 or TCP-AO methods for providing message authenticity and integrity. In a TCP-MD5 case, each packet (segment) is signed with the MD5 Digest (16 bytes) which is formed using the pre-configured "Password" as the key and same is validated by the receiver. In a TCP-AO case, each packet (segment) is generated with HMAC using the pre-configured "Key-Chain" and added to the packet. Same is validated by the receiver using the corresponding key-chain.

However, SXP payload cannot be encrypted, as the receiver needs to validate the source of the packet and subsequently authenticates as well as validates the integrity of the message by selecting the respective source key. This problem is solved in the disclosed method, which provides SXP payload encryption with the use of PQPSK (data confidentiality).

To avoid DDoS attack on PQPSK-ID, the Key Server should include some authentication information along with PQPSK-ID generated by the SKS such as Attestation information: Canary stamp, Hardware fingerprint etc. The authentication information may also include signature signed on PQPSK-ID by Speaker using private key (stored securely on SUDI/ACT2/TAM chip, which is tamper proof). SKS on Speaker generates (PQPSK Key, PQPSK-ID) pair, which is unique per device. Speaker would generate signature by signing on PQPSK-ID using its private key and include that signature also as part of PQPSK-ID TLV. The consolidated PQPSK-ID TLV is shared to the Listener. Listener validates the signature using public key of Speaker before accepting the PQPSK-ID sent by the Speaker.

A set of PQPSK TLVs are introduced to provide post-quantum security, including PQPSK Capability TLV for exchanging PQPSK capabilities to identify the ability for post-quantum security, PQPSK-ID Information TLV for sending PQPSK-ID from Speaker (Key Server) to Listener (Non-Key Server), and PQPSK-ID Status TLV for sending PQPSK-ID Status from Listener (Non-Key Server) to Speaker (Key Server), similar to Tables 1-3 in Example 1.

In some aspects, a SXP connection between Switches may be considered. The same method can be used for the SXP connection "between Routers", "between Router and Switch" or "between Switch and WLC," i.e. a SXP connection may be applicable "between Routers" or "between Switch & Router" or "between Switch and WLC".

The disclosed method is divided into two phases as explained below. Phase-1 includes sharing a secret seed value between Speaker and Listener. This phase is similar to that described in Example 1. As part of manufacturing, Private key (SK) and Public key (PK) are generated on Switch-1 (Speaker) and Switch-2 (Listener) using a quantum secure algorithm such as McEliece algorithm. This is a one-time process. In a TPM/vTPM scenario, a manufacturing team generates private and public keys using same root CA (e.g. through PKI). These generated keys are stored in SUDI/ACT2/TAM chip on Switch-1 (Speaker) and Switch-2 (Listener). Public keys (Root CA certificate chain) are bundle as part of image.

A third party support includes that McEliece's Public keys can also be exchanged between peers over the out-of-band secure connection, to support third party certificates.

Phase-1 includes Private Key (SK) and Public key (PK) of Switches. For Switch-1, assume, SK1 and PK1. For Switch-2, assume, SK2 and PK2.

SXP may have two roles, i.e. "Speaker" and "Listener". Assume that, SXP with a role as "Speaker" acts as a Key Server (e.g. Switch-1). HKDF is used to generate a unique "secret seed value" on the Key Server (e.g. Switch-1) for the SXP connection. The generated "secret seed value" is encrypted with the Public Key PK2 of Switch-2 and generates Cipher-text. The Cipher-text is sent to Switch-2. Switch-2 decrypts the Cipher-text using its Private Key SK2." Now, both Switch-1 and Switch-2 have the common secret seed, which is used by SKS in Phase-2.

Figure 10:
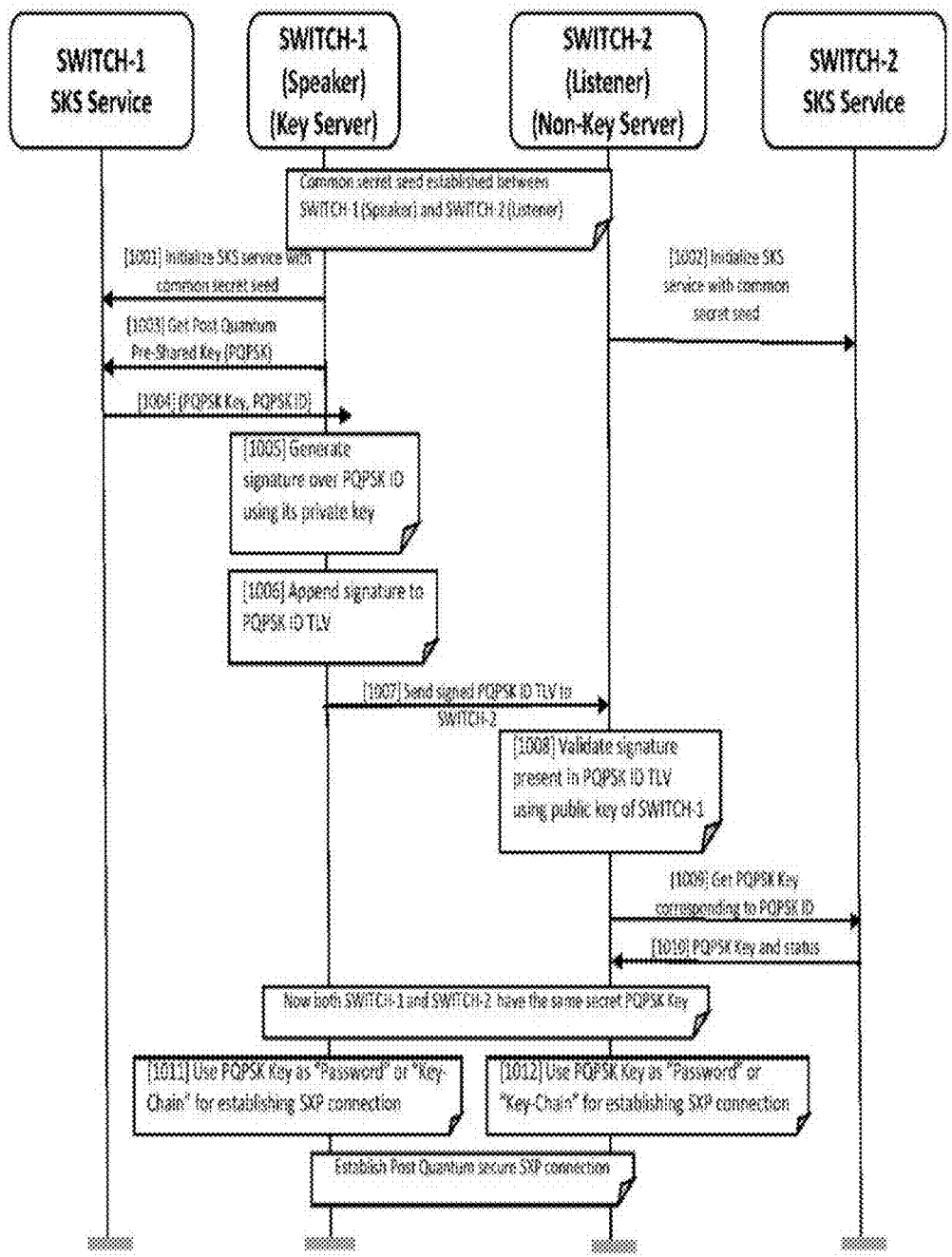
FIG. 10 is a sequence diagram depicting operations for post-quantum secure SXP connection establishment between Speaker and Listener using SKS, in accordance with some aspects of the disclosed technology.

Phase-2 includes generating the same PQPSK using SKS service. FIG. 10 is a sequence diagram depicting operations for post-quantum secure SXP connection establishment between Speaker and Listener using SKS, in accordance with some aspects of the disclosed technology. At 1001-1010, the steps are similar to FIG. 9 in Example. Switch-1 and Switch-2 use their local SKS services to generate a pair of PQPSK Key, PQPSK-ID based on the common secret seed exchanged in Phase-1. The SKS is a software entity implemented inside Switches. Switch-1 and Switch-2 initialize their local SKS instance with the common secret seed exchanged in Phase-1. Switch-1 (Key Server) may request its local SKS instance to generate a first PQPSK. The SKS generates PQPSK Key and PQPSK-ID. Switch-1 receives the PQPSK Key and PQPSK-ID from the local SKS instance. Switch-1 sends the PQPSK-ID to Switch-2. Switch-2 requests its local SKS instance to fetch PQPSK Key corresponding to the PQPSK-ID received from the Switch-1.

Since SKS instances of Switch-1 and Switch-2 start with the same secret seed, Switch-1 and Switch-2 have the same PQPSK Key. Now, both Switch-1 and Switch-2 have the same PQPSK Key. Switch-1 and Switch-2 can use the PQPSK Key as "Password" for TCP-MD5 or "Key-Chain" for TCP-AO methods. At 1011 and 1012, both Switch-1 and Switch-2 use the PQPSK key as "Password" or "Key-Chain" for establishing SXP connection. Once both sides have the same "Password" or "Key-Chain", Switch-1 and Switch-2 would initiate the SXP connection. Upon successful SXP connection, authenticity and integrity of all data packets (segments) can be validated per the SXP protocol. Optionally, SXP can use PQPSK as symmetric key to provide data confidentiality (encryption/decryption of SXP payload).

The benefits of the disclosed method include no manual configuration required for the pre-shared keys to establish SXP connection between peer devices and frequent key refresh with no administrative cost. The Private and Public Key can be populated by the TPM/vTPM available on the peer devices and can enhance authenticity of the peer devices.

Anytime Switch-1 wants to refresh the SXP key, Switch-1 and Switch-2 can run the above procedure. Hence, Switch-1 and Switch-2 can refresh their keys at will, without any administrative intervention and without ever exhausting their shared keys.

The TPM functionality is embedded in a wide variety of devices including Mobile phones, PCs and Routers. Attestation as defined by TCG describes, how the TPM can be used as a hardware root of trust and offer Proof of Integrity of a node, where integrity includes Hardware, Software, or Runtime, among others.

TPM may be used to generate Private and Public Key pair. If TPM/vTPM is available, then private and public keys are populated by the TPM. In TPM consideration (for hardware), TPM can be used to secure the network devices by protecting device identity (and hence resistant to physical attacks). TPM can also be used to generate cryptographic keys for providing authentication and encryption functionality at the software/application level. In other words, TPM provides hardware fingerprint which can be used as device identity.

The certified Public and Private key (PK, SK) pair is provided by the TPM available on the microchip of the device (node). Generally, TPM does not expose security keys to applications, but provides option to migrate the keys, so that the applications can use the keys for authentication and encryption methods.

In vTPM consideration (for software/virtual), Virtual Trusted Platform Modules (vTPMs) have been widely used in commercial cloud platforms (e.g. Google Cloud, VMware Cloud, and Microsoft Azure) to provide virtual root-of-trust for virtual machines. In vTPMs, instead of using physical NVRAM, it uses a file, denoted as a NVRAM file, to hold secret keys. Similar to a physical TPM chip, a vTPM stores credentials for trust & identity, crypto operations and integrity measurement in this file.

There are couple of methods to protect a vTPM. A TPM-based protection uses a physical TPM to seal the NVRAM file of a vTPM to bind the vTPM to the physical TPM and provision static protection for TPM's secret data. A tailored lightweight VM supports virtual TPM functions. This method relies on VM isolation to provide security separation.

Also, a SMM-based protection places the vTPM into CPU System Management Mode (SMM) to achieve strong isolation. This vTPM is used to generate private Key and Public Key pair for the applications to use for the authentication and encryption functionality.

HMAC Key Derivation function (HKDF) is used to derive an encryption key from a pass phrase. Initially HKDF creates a pseudorandom key (PRK) using a pass phrase and a salt value, in order to produce an HMAC hash function (such as HMAC-SHA256), and along with a salt value. Next the PRK output is used to produce a key of the required length. For a 16-byte output (32 hex characters), a 128-bit key may be generated. For a 32-byte output (64 hex characters), a 256-bit key may be generated.

Example 3: Quantum Resistant Security for Border Gateway Protocol (BGP)

Border Gateway Protocol (BGP) is an inter domain routing (i.e. exterior gateway) protocol designed to provide loop-free routing between separate routing domains that contain independent routing policies (autonomous systems). It uses TCP (port 179) as the underlying transport protocol to communicate between two BGP peers.

Conventionally, BGP uses following methods for providing message authenticity and integrity. Using TCP-MD5 may require pre-configured key (md5-key) on both sides of the point-to-point link and may use TCP-MD5 option with MD5 Digest. Using TCP-AO may require pre-configured key-chain on both sides of the point-to-point link and uses TCP-AO option with HMAC. In the above methods, user or administrator may configure the same pre-shared key on both peer devices and it is cumbersome if a large number of devices need to be configured in deployments. There are concepts such as peer-group and peer-session templates to reduce the manual configuration, but still there are handful of manual configurations (manual configurations are known to be error prone). There are also methods where BGP can use PKI based security mechanisms to provide data confidentiality (encryption/decryption) along with authentication and integrity, but suffers from cryptanalysis attacks by quantum computing using Shor's or Grover's algorithms.

Also, existing configurations use "md5-key" for TCP-MD5 or "Key-Chain" for TCP-AO for establishing BGP session over TCP. In this method, a user may manually configure the same secret (pre-shared key) on both the devices. Manual configuration would be error-prone and cannot scale with more number of devices in the deployment. The BGP session uses TCP-MD5 or TCP-AO methods for providing message authenticity and integrity. In a TCP-MD5 case, each packet (segment) is signed with the MD5 Digest (16 bytes) which is formed using the pre-configured "md5-key" as the key and same is validated by the receiver. In a TCP-AO case, each packet (e.g. segment) is generated with HMAC using the pre-configured "Key-Chain" and added to the packet. The same is validated by the receiver using the corresponding "Key-Chain." Existing methods provide authenticity and integrity with the use of same pre-shared keys across the peer devices. However, BGP payload cannot be encrypted, as the receiver needs to validate the source of the packet and subsequently authenticate as well as validates the integrity of the message by selecting the respective source key.

The disclosure provides quantum resistant methods to distribute keys between BGP peers. The methods of key distribution are quantum resistant, and de-centralized and do not need manual configuration of pre-shared keys. The disclosed method establishes quantum resistant BGP session between BGP peers (also referred to as BGP Speakers), by extending the BGP protocol to allow one of the BGP Speaker (with highest Router ID/BGP identifier, acts as a Key Server) to distribute post-quantum identifier (PQPSK-ID) to the BGP peer. The secret seed and PQPSK-ID are exchanged in BGP protocol specific TLVs. The disclosed method adds a signature to the PQPSK-ID TLV while exchanging between the Key Server (e.g. BGP Speaker) and the Non-Key Server (e.g. peer) to provide authentication and hence to avoid DDoS attacks. The disclosed method uses HKDF to generate a unique "secret seed value" on the Key Server. The generated PQPSK Key is used as "md5-key" for TCP-MD5 or "Key-Chain" for TCP-AO to establish secure BGP sessions across BGP peers or peer devices.

To avoid DDoS attack on the PQPSK-ID, Key Server can include some authentication information along with the PQPSK-ID generated by the SKS such as a signature signed on the PQPSK-ID by the Key Server using a private key (stored securely on SUDI/ACT2/TAM chip, which is tamper proof).

The SKS of the Key Server generates a pair of PQPSK Key and PQPSK-ID, which is unique per peer or peer device. The Key Server would generate signature by signing on PQPSK-ID using its private key and include that signature also as part of PQPSK-ID TLV. This consolidated PQPSK-ID TLV is shared to the peer. The peer validates the signature using public key of the Key Server before accepting the PQPSK-ID sent by the Key Server.

A set of PQPSK TLVs are introduced to provide post-quantum security, including PQPSK Capability TLV for exchanging PQPSK capabilities to identify the ability for post-quantum security, PQPSK-ID Information TLV for sending PQPSK-ID from the Key Server to the peer (Non-Key Server), PQPSK-ID Status TLV for sending PQPSK-ID Status from the peer to the Key Server. This is similar to Examples 1 and 2.

The above method is explained in two phases as below. The BGP session between Routers is considered. Phase-1 includes sharing secret seed value between BGP peers. Phase 1 is similar to Phase-1 in Examples 1 and 2. As part of manufacturing, Private and Public keys are generated on Router-1 (which acts as a Key Server, selected based on highest Router ID/BGP Identifier) and Router-2 (which acts as a Non-Key Server) using quantum secure algorithm such as McEliece algorithm. This is a one-time process. In a TPM/vTPM scenario, a manufacturing team generates private and public keys using same root CA (e.g. through PKI). These generated keys are stored in SUDI/ACT2/TAM chip on Router-1 (Key Server) and Router-2 (Non-Key Server). Public keys (Root CA certificate chain) are bundle as part of image. For a third party support, McEliece's Public keys can also be exchanged between peers over the out-of-band secure connection, to support the third party certificates.

Phase-1 includes (1) Private and Public key of Routers, for Router-1, SK1 and PK1, and for Router-2, SK2 and PK2. One of the BGP Speaker (having the highest Router ID/BGP Identifier) acts as "Key Server" (e.g. Router-1). HKDF (HMAC Key Derivation Function) is used to generate a unique "secret seed value" on the Key Server (Router-1) for this BGP session. The generated "secret seed value" is encrypted with the Public Key PK2 of Router-2 to generate Cipher-text, which is sent to Router-2. Then, Router-2 decrypts the Cipher-text using its Private Key SK2, and populates back "secret seed value". Now, both Router-1 and Router-2 have common "secret seed", which is used by SKS in Phase-2.

Figure 11:
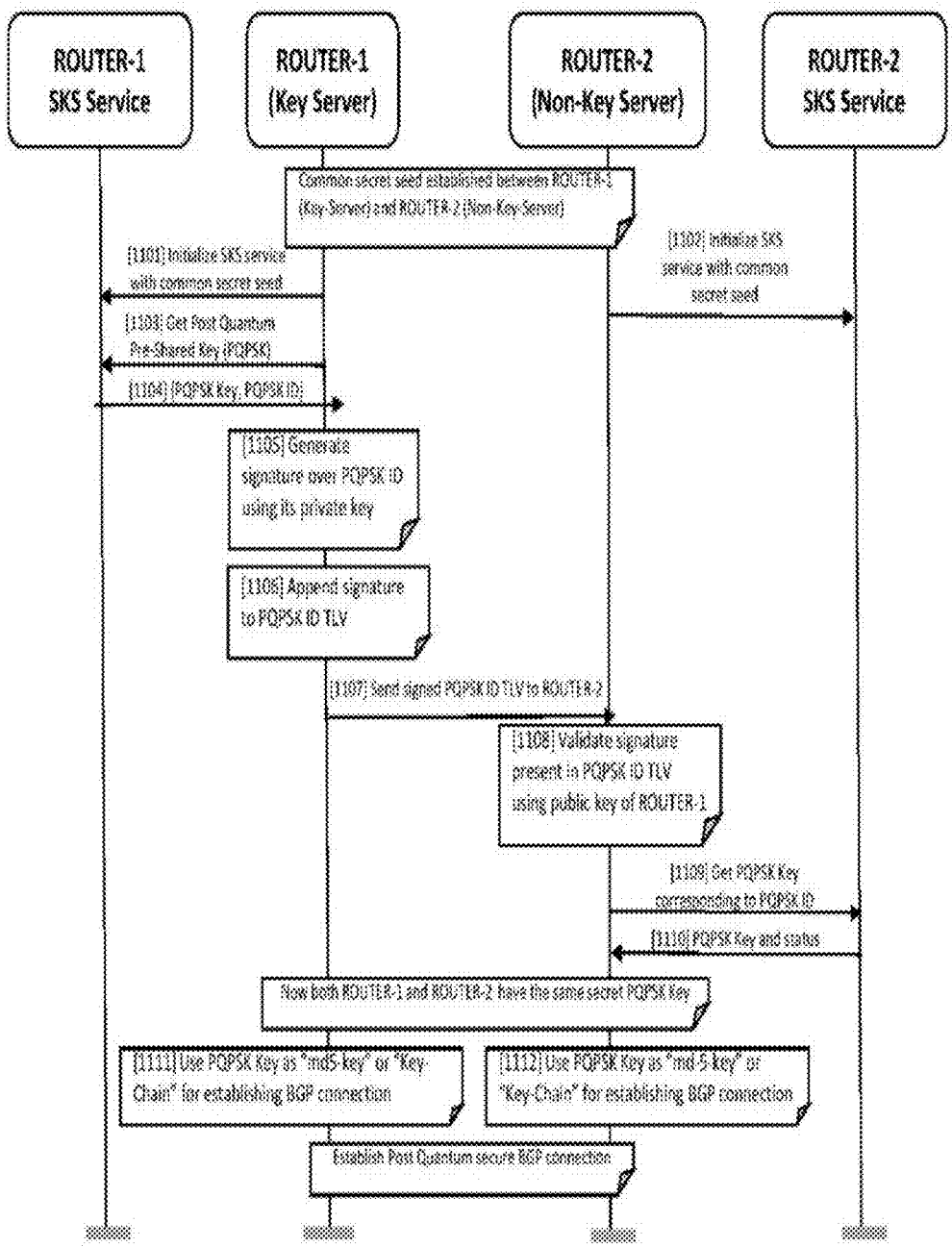
FIG. 11 is a sequence diagram depicting operations for post-quantum secure BGP session between BGP peers using SKS, in accordance with some aspects of the disclosed technology.

Phase-2 includes generating the same pre-shared key using SKS service. FIG. 11 is a sequence diagram depicting operations for post-quantum secure BGP session between BGP peers using SKS, in accordance with some aspects of the disclosed technology. At 1101-1110, the operations are similar to FIGS. 9 and 10. Router-1 and Router-2 use their local SKS services, each of which generates a pair of PQPSK Key and PQPSK-ID based on the common secret seed exchanged in Phase-1. The SKS is a software entity implemented inside Routers. Router-1 and Router-2 initialize their local SKS instance with the common secret seed exchanged in Phase-1. Router-1 (Key Server) requests its local SKS instance to generate a PQPSK. SKS generates a pair of PQPSK Key and PQPSK-ID. Router-1 receives the PQPSK Key and PQPSK-ID from the local SKS instance. Router-1 sends the PQPSK-ID to Router-2. Router-2 requests its local SKS instance to fetch PQPSK Key corresponding to the PQPSK-ID received from the Router-1. Since the SKS instances of Router-1 and Router-2 start with the same seed secret, Router-1 and Router-2 have the same PQPSK Key.

Now, Router-1 and Router-2 have the same PQPSK Key. At 1111 and 1112, Router-1 and Router-2 can use the PQPSK Key as "md5-key" for TCP-MD5 or "Key-Chain" for TCP-AO methods for establishing BGP session. Once both sides have same "md5-key" or "Key-Chain", Router-1 and Router-2 would initiate the BGP session.

Upon the successful BGP session, authenticity and integrity of all data packets (segments) can be validated per the BGP protocol. Optionally, BGP can use PQPSK as symmetric key to provide data confidentiality (encryption/decryption of BGP payload).

When Routers want to refresh the BGP key, Router-1 and Router-2 can run the above procedure. Hence, Router-1 and Router-2 can refresh their keys at will, without any administrative intervention and without ever exhausting their shared keys.

The benefits of the disclosed method include the following. There is no manual configuration required for the pre-shared keys to establish BGP session. Also, the Private and Public Key can be populated by the TPM/vTPM available on the device and can enhance authenticity of the device. Also, the method provides a quantum resistant secure BGP session between peer devices. Further, the method allows frequent key refresh with no administrative cost.

Example 4: Quantum Resistant DNSCrypt for Umbrella (OpenDNS) Cloud in Enterprise Deployments Every DNS query from the client (wired or wireless) is forwarded to the Umbrella Cloud by the Switch or WLC. If any FQDN is blocked by the policy as configured on the Umbrella Cloud, then instead of sending resolved IP address in the DNS response, IP address of the Blocked page is sent. Hence client would be redirected to the blocked page. Alternatively, if any FQDN is not blocked, then DNS response is sent with the resolved IP address.

The methods use the DNSCrypt feature to encrypt the DNS packets exchanged between Switch/WLC and Umbrella Cloud. Apart from DNSCrypt, other methods use DNS-Over-TLS, DNS-Over-HTTPS, DNSCurve, DNSSEC etc. to provide enhanced security.

The DNSCrypt feature uses Public Key Infrastructure (Certificate based/Public Key: Private Key pair) to generate a symmetric key which is used for encrypting DNS traffic. However, PKI methods are vulnerable to cryptanalysis attacks by quantum computing using Shor's or Grover's algorithms. In other words, the public key (asymmetric encryption) method used to generate symmetric key for DNSCrypt in OpenDNS is not immune to cryptanalysis attacks. In contrast, pre-shared key (symmetric encryption) methods are immune to these cryptanalysis attacks.

The disclosure addresses the key distribution issue across large OpenDNS deployments. The disclosure provides a method to exchange quantum resistant pre-shared key used by DNSCrypt to encrypt DNS packets exchanged between OpenDNS server (Umbrella Cloud) and Switch/WLC, which provides secure DNS traffic especially in OpenDNS (Umbrella) deployments. The disclosure also provides authentication to the PQPSK-ID shared between Key Server (Umbrella) and Non-Key Server (WLC/Switch).

The disclosed method exchanges quantum resistant pre-shared keys between OpenDNS server (also referred to as Umbrella Server) and Switch/WLC, by using special DNS Query and Response packets to allow Umbrella Server to distribute post-quantum symmetric keys to the Switch/WLC which can be used to encrypt the DNS traffic. In particular, the disclosed method exchanges the PQPSK-ID TLV in special DNS packets. The generated PQPSK is used for deriving keys for DNSCrypt engine.

The Umbrella server is also referred to Umbrella Cloud, OpenDNS Server, Umbrella, OpenDNS, or a Cloud-based security service, which are used interchangeably in the disclosure.

With the integration of Umbrella Cloud on Switches and WLCs, Switches and WLCs register with the Umbrella Cloud using API token over HTTPS. Also, the Switches and WLCs can register the Tag/Profile with the Umbrella as per the configured policy. The policy enforcement for the DNS query is done based on the device identifier, organization ID, client IP etc., to block or allow particular FQDN (Full Qualified Domain Name).

For the enterprise deployments with Switch (wired case) and WLC (wireless case) acting as DNS proxy/forwarder for thousands of clients, deployment would be more secure when a quantum resistant pre-shared key is incorporated to generate pre-shared key between OpenDNS server and device (Switch/WLC) for encrypting DNS traffic.

Figure 12:
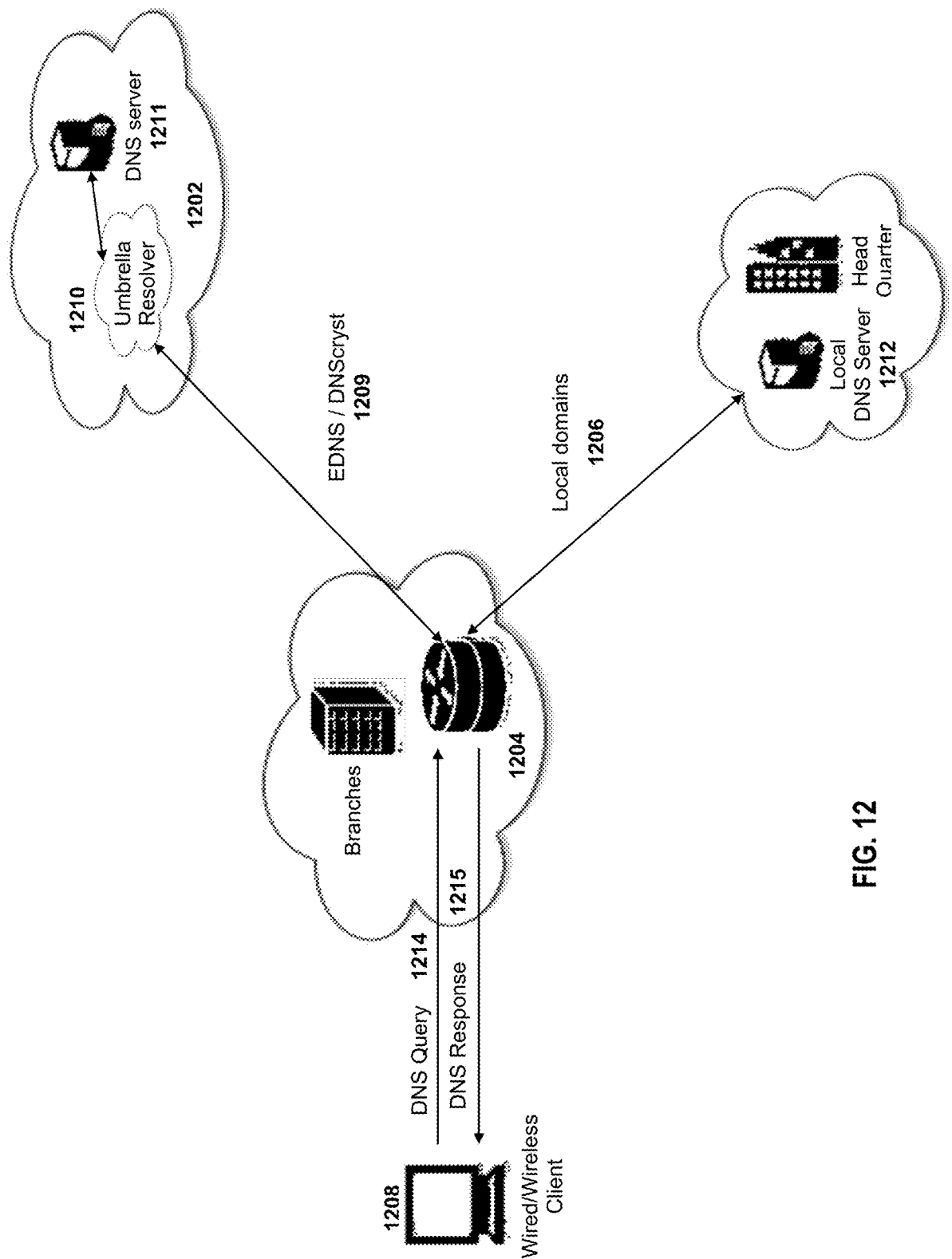
FIG. 12 is a system diagram for Umbrella (OpenDNS) Cloud in Enterprise deployments, in accordance with some aspects of the disclosed technology.

Umbrella Cloud in Enterprise deployments are illustrated in FIG. 12. As shown in FIG. 12, in the enterprise deployments, Switch (wired) and WLC (wireless) are the point of contact for the Umbrella Cloud for all the clients behind them. As shown in FIG. 12, an Umbrella or Umbrella Cloud 1202 provides a cloud-based security service by inspecting the DNS query 1214 that is sent to an Umbrella Branch Connector or Umbrella Connector or Switch/WLC 1204 from a wired or wireless client 1208. When the wired or wireless client 1208 initiates the traffic and sends the DNS query 1214, the Umbrella Connector or Switch/WLC 1204 intercepts and inspects the DNS query 1214 from the wired or wireless client 1208. If the DNS query 1214 is for a local domain 1206, the Umbrella Connector 1204 forwards the DNS query 1214 without changing the DNS packet to the local DNS server 1212 in the enterprise network. If the DNS query 1214 is for an external domain, such as an Umbrella Integration Cloud Domain, the Umbrella Connector 1204 adds an Extended DNS (EDNS)/DNScrypt 1209 to the DNS query 1214 and sends it to an Umbrella Resolver 1210, which is in an electrical communication with an external DNS server 1211. All DNS Query and Response packets are encrypted using quantum secure encryption key. The EDNS 1209 includes the device identifier information, organization ID and client IP. Based on this information, the Umbrella Cloud 1202 applies different policies to the DNS query 1214. The Umbrella Connector 1204 in the device (Switch/WLC) can receive a DNS response 1215 from the DNS server 1211 or the local DNS server 1212 and then sends the DSN response 1215 to the wired or wireless client 1208.

DNSCrypt is an encryption protocol to authenticate communications between the device (Switch/WLC) and the Umbrella Cloud. Whenever it is enabled, a certificate is downloaded from the Umbrella Cloud and a shared secret key is negotiated between the device and Umbrella Cloud, which is used to encrypt the DNS queries. For every interval (e.g. every 24 hour) this certificate is automatically downloaded and a new shared secret key is negotiated to encrypt the DNS queries.

Switch/WLC acts as a DNS client while Umbrella Cloud acts as a DNS resolver. DNSCrypt prevents any spying, DNS spoofing and man-in-the-middle attacks. DNSCrypt uses cryptographic signatures to verify that responses originating from the chosen DNS resolver and haven't been tampered with, but suffers from cryptanalysis attack. DNSSEC provides authentication i.e. the DNS response coming from the owner of the domain name is valid and not tampered. DNSSEC also provides a chain of trust to help establish confidence that the received response is verifiable.

Switch/WLC can register with the Umbrella Cloud using API token and Switch/WWLC can also register Tag/Profile per the configured policy. Policy enforcement can be done on the DNS query to allow or block particular FQDN. Registration from Switch/WLC uses HTTPS method to securely communicate with Umbrella. Also, the DNSCrypt feature is used to encrypt the DNS packets exchanged between Umbrella and Switch/WLC. The DNSCrypt feature uses PKI methods (certificate based/asymmetric algorithm) to generate symmetric keys to encrypt the DNS packets.

The disclosed method exchanges quantum resistant pre-shared key, which can be used by DNSCrypt to encrypt DNS packets exchanged between OpenDNS server or Umbrella Cloud and Switch/WLC. Here, Switch/WLC acts as a DNS client and can be extended between SD-WAN and Secure Internet Gateway (SIG) as well.

The disclosed method provides authentication to the PQPSK-ID shared between Umbrella and WLC/Switch. The method generates and exchanges quantum resistant pre-shared key between Umbrella server and Switch/WLC by using the special DNS Query and Response packets to allow the Umbrella Server to distribute Post-Quantum Pre-Shared Key Identifier (PQPSK-ID) to the Switch/WLC.

Subsequently, Umbrella Server and Switch/WLC use the PQPSK-ID to get the same post-quantum pre-shared key (PQPSK) from the SKS, also referred to as Quantum Key Source (QKS), which can be used to encrypt the DNS traffic between Switch/WLC and Umbrella Server.

To avoid DDoS attack and man-in-the-middle attack on PQPSK-ID, Key Server can include some authentication information along with PQPSK-ID generated by the SKS. The authentication may include signature signed on PQPSK-ID by Umbrella Server using private key. SKS on Umbrella Server generates (PQPSK Key, PQPSK-ID) pair, which can be unique per Switch/WLC. Umbrella Server would generate the signature by signing on PQPSK-ID using its private key and include that signature also as part of PQPSK-ID TLV. Umbrella Server shares this consolidated PQPSK-ID TLV to the Switch/WLC. Switch/WLC validates the signature using public key of Umbrella Server before accepting the PQPSK-ID sent by the Umbrella Server.

The authentication may include encryption. The PQPSK Capability, PQPSK-ID and PQPSK Status TLVs exchanged in special DNS Query and Response packets between Switch/WLC and Umbrella server can be encrypted using existing DNSCrypt methods as Switch/WLC and Umbrella server are exchanged after initial handshake (where symmetric key is already exchanged).

A set of PQPSK TLVs are introduced to provide post-quantum security, as shown in Tables 1-3. The set of PQPSK TLVs include PQPSK Capability TLV for exchanging PQPSK capabilities to identify the ability for post-quantum security. The set of PQPSK TLVs also include PQPSK-ID Information TLV for sending PQPSK-ID from Umbrella Server (Key Server) to Switch/WLC (Non-Key Server). The set of PQPSK TLVs further include PQPSK Status TLV for sending PQPSK-ID Status from Umbrella server (Key Server) to Switch/WLC (Non-Key Server).

For PQPSK Capability TLV, each Switch/WLC supports post-quantum Pre-Shared Key (PQPSK) and announces its capability as part of PQPSK capability TLV and is sent in special DNS Query packet to the Umbrella Server.

Distribution of PQPSK-ID information TLV (Type, Signature, PQPSK-ID, Checksum) (Umbrella Server→Switch/WLC) is provided. When both Umbrella Server and Switch/WWLC are PQPSK capable, then Umbrella Server (Key Server) generates the PQPSK-ID with the help of local SKS service and distribute to the Switch/WLC in PQPSK-ID TLV in special DNS Response packet which is sent in-response to special DNS Query packet.

Post Quantum PSK Status TLV (Umbrella Server→Switch/WLC) is provided. The TLV is sent from Umbrella Server to Switch/WLC. When PQPSK Capability TLV is received by Umbrella Server from the Switch/WLC. If Umbrella supports PQPSK functionality, then it sends back PQPSK status as "Success" and if it does not support PQPSK functionality, then it sends back PQPSK status as "Reject" in special DNS Response packet. Upon receiving PQPSK status as "Reject", Switch/WLC would fallback to legacy DNSCrypt functionality.

The initial registration and subsequent encryption of DNS query/response are explained as below. The disclosed method is divided into two phases. Phase-1 includes generating shared secret key using PKI method (Existing Method).

In Phase-1, Registration with the Umbrella Cloud includes i) Get the API token from the Umbrella registration server; ii) Configure API token on the Switch/WLC; iii) Configure user defined "umbrella_profile_tag" on the Switch/WLC; iv) Establish HTTPS connection with the Umbrella registration server; v) Register configured "umbrella_profile_tag" with the Umbrella portal (api.opendns.com).

In Phase-1, Pre-Configured resolvers IP addresses on Switch/WLC. For example, default values of Umbrella Anycast resolvers are 208.67.222.222 and 208.67.220.220 which are preconfigured on Switch/WWLC.

In Phase-1, Pre-Configured Server Public Key on the Switch/WLC. Specifically, Public Key of Umbrella Integration Anycast Servers is preconfigured on Switch/WLC. Public Key is "B735:1140:206F:225D:3E2B:D822:D7FD:691E:A1C3:3CC8:D666:8DOC:BE04:BFAB:CA43:FB79". It is used to download the DNSCrypt certificate from Umbrella Integration cloud. New key generation may occur for every 24 hrs.

In Phase-1, once DNSCrypt is enabled on the Switch/WWLC. Specifically, Switch/WLC downloads DNSCrypt certificate from the Umbrella Cloud. Switch/WLC generates client keys (client_publickey and client_secretkey). Switch/WLC generates shared_secret_key (using PKI method). It is the shared key derived from resolver_publickey (which is part of server certificate) and client_secretkey. It is used to encrypt the query from Switch/WLC to Umbrella Cloud (as part of DNSCrypt). Finally in Phase-1, the shared secret key is available both on Switch/WLC and Umbrella Server. This shared secret key is used as seed secret for Phase-2.

Phase-2 includes generating same quantum resistant pre-shared key using SKS service (Proposed/Novel). Umbrella and Switch/WLC use a SKS service which generates a (PQPSK Key, PQPSK-ID) pair based on the common seed secret exchanged in phase-1. The SKS is a software entity implemented inside Umbrella Server and Switch/WLC.

Figure 13:
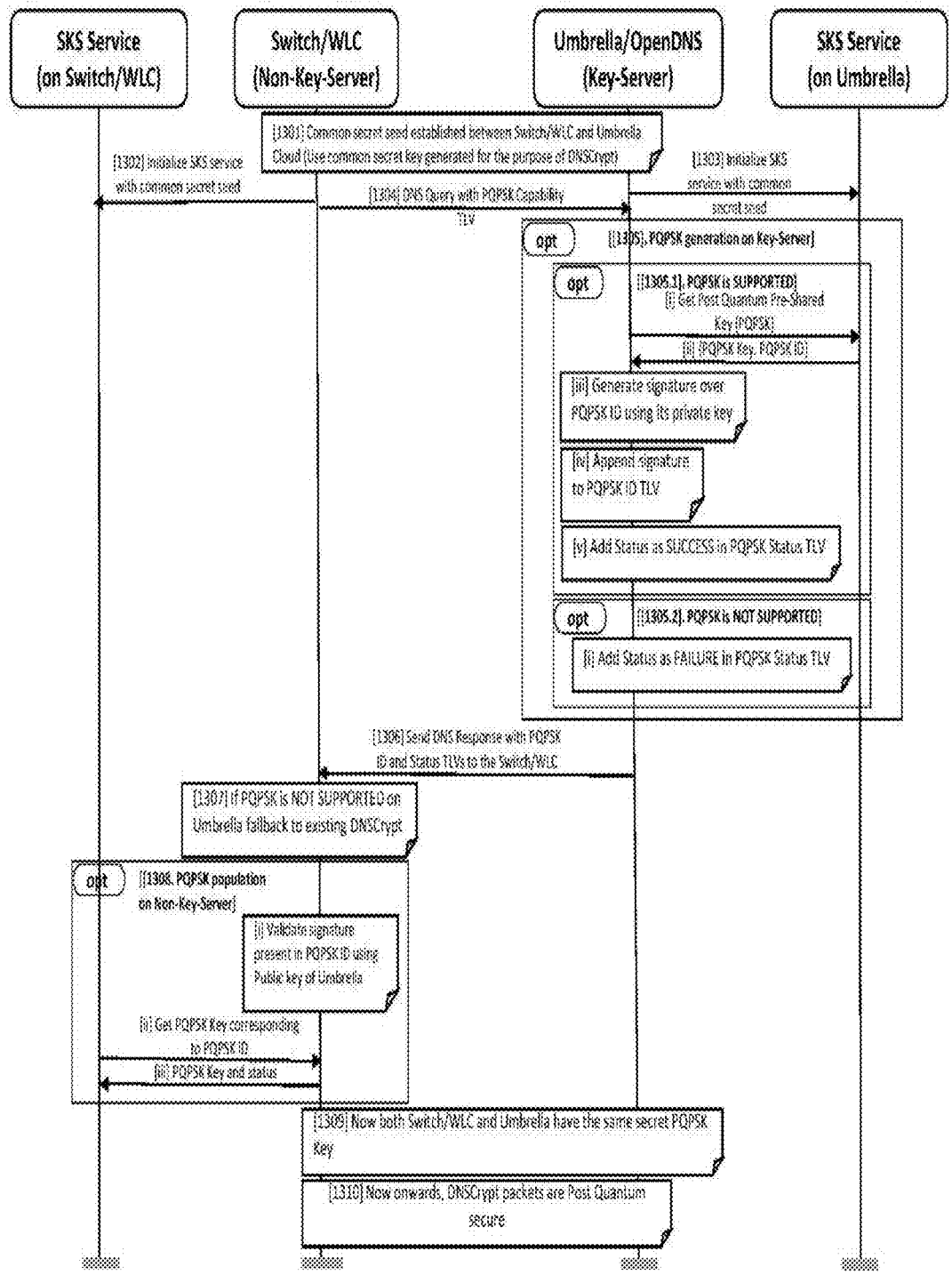
FIG. 13 is a sequence diagram depicting operations for post-quantum secure DNS between Switch/WLC and Umbrella Cloud using SKS, in accordance with some aspects of the disclosed technology.

FIG. 13 is a sequence diagram depicting operations for post-quantum secure DNS between Switch/WLC and Umbrella Cloud using SKS, in accordance with some aspects of the disclosed technology. As shown in FIG. 13, at 1302 and 1303, Phase-2 starts with that Umbrella Server and Switch/WLC initialize their local SKS instance with the common seed secret exchanged in Phase-1.

In Phase-2, the steps use TLVs to exchange information between Umbrella and Switch/WLC in "Special DNS Query/Response." At 1304, Switch/WLC sends "DNS Query" with PQPSK Capability TLV to the Umbrella Server. At 1306, the Umbrella Server sends DNS response with PQPSK-ID and Status TLVs to the Switch/WLC, which is sent in a "Special DNS Response" packet in response to the "DNS Query" packet requesting for PQPSK-ID and Status. These are special DNS query and response packets used for exchanging PQPSK Capability and PQPSK-ID.

At 1305, if PQPSK is supported, the Umbrella Server generates PQPSK, including similar procedures as described in Examples 1-4. For example, Umbrella Server (Key Server) requests its local SKS instance to generate a secret key. Then, the local SKS generates the secret key (PQPSK Key). A unique identity PQPSK-ID is paired with each PQPSK Key generated. Then, the Umbrella Server receives PQPSK Key and corresponding unique identity PQPSK-ID from the local SKS instance. Then, the Umbrella Server adds Status as Success in PQPSK Status TLV.

Alternatively, if PQPSK is not supported, the Umbrella Server adds Status as Failure in PQPSK Status TLV. At 1307, if PQPSK is not supported, the Switch/WLC falls back to existing DNSCrypt.

At 1308, Switch/WLC requests its local SKS instance to fetch PQPSK Key corresponding to the PQPSK-ID received from the Umbrella Server. Since SKS instances of Umbrella Server and Switch/WLC have started with the same seed secret, they have the same PQPSK Key corresponding to the PQPSK-ID.

At 1309, the Umbrella Server and Switch/WLC have the same PQPSK Key for encrypting the DNS traffic (DNSCrypt). At 1310, DNSCrypt packets are Post-Quantum secure. Anytime Umbrella Server wants to refresh the PQPSK, Umbrella Server and Switch/WLC run the above procedure. Hence Umbrella Server and Switch/WLC can refresh their keys at will, without any administrative intervention and without ever exhausting their shared keys.

The benefits of the disclosed method uses quantum resistant pre-shared key to encrypt DNS packets between Umbrella Server and Switch/WLC and allows frequent key refresh with no administrative cost.

Example 5: Quantum Secure Communication in SDWAN Cluster Deployments

SDWAN or SD-WAN customers manage workloads via vManage, where security, availability, scale and predictability cannot be compromised. For achieving high availability and high performance of operations in non-trivial overlay topology, a single vManage is not sufficient. Along with scaling up vManage vertically, even scale out horizontally by having cluster of vManage devices. The vManage supports a cluster of a number nodes (e.g. 3-6 nodes) managing up to thousands of vEdge/cEdge devices.

Conventionally, there are many methods (DTLS/IPSec) to establish secure communication between devices. These methods use public key infrastructure (PKI) to do mutual authentication based on certificate and establish secure communication using asymmetric key algorithms. As known in the art, public key (asymmetric encryption) algorithms are not immune to cryptanalysis attacks from quantum computers, while pre-shared key (symmetric encryption) is immune to cryptanalysis attacks. It is harder to deploy pre-shared keys, and is difficulty in managing a pool of secret keys (i.e. in this case, one for each Worker) deployed across different locations. The problem also includes difficulty in refreshing and changing the pre-shared secret keys.

The disclosure provides a quantum resistant key exchange method across devices in SDWAN cluster deployments, along with addressing different vulnerabilities such as Reply Attack, Man-in-the-middle Attack (MITM attack) among others. The disclosure provides a quantum resistant and secure way of key distribution to establish quantum secure communication in SDWAN cluster deployments. The disclosed method provides authentication while sharing the PQPSK-ID between Master and Worker by a signature over the TLV to avoid DDoS attacks. A worker ID generated during the device onboarding is used as PQPSK-ID of the Worker device.

Master vManage device onboards the Worker vManage devices by authenticating using a SUDI certificate (TPM/vTPM). As part of onboarding, the Master vManage device generates nonce and signs nonce using its private key and shares the signed nonce with the Worker vManage device. The signed nonce acts as a Worker ID and also the same is used as PQPSK-ID for generating PQPSK Key using SKS running on the device. The signed nonce is cached on the Master vManage device which can be used whenever the Worker vManage device re-connects back to the Cluster.

Post-Quantum Cryptography is critical for SDWAN security in quantum era. In the SDWAN deployments to manage workloads along with providing high availability and high performance operations, single the vManage is not sufficient. Hence, a cluster of vManages may be sufficient to handle such a scale.

Figure 14:
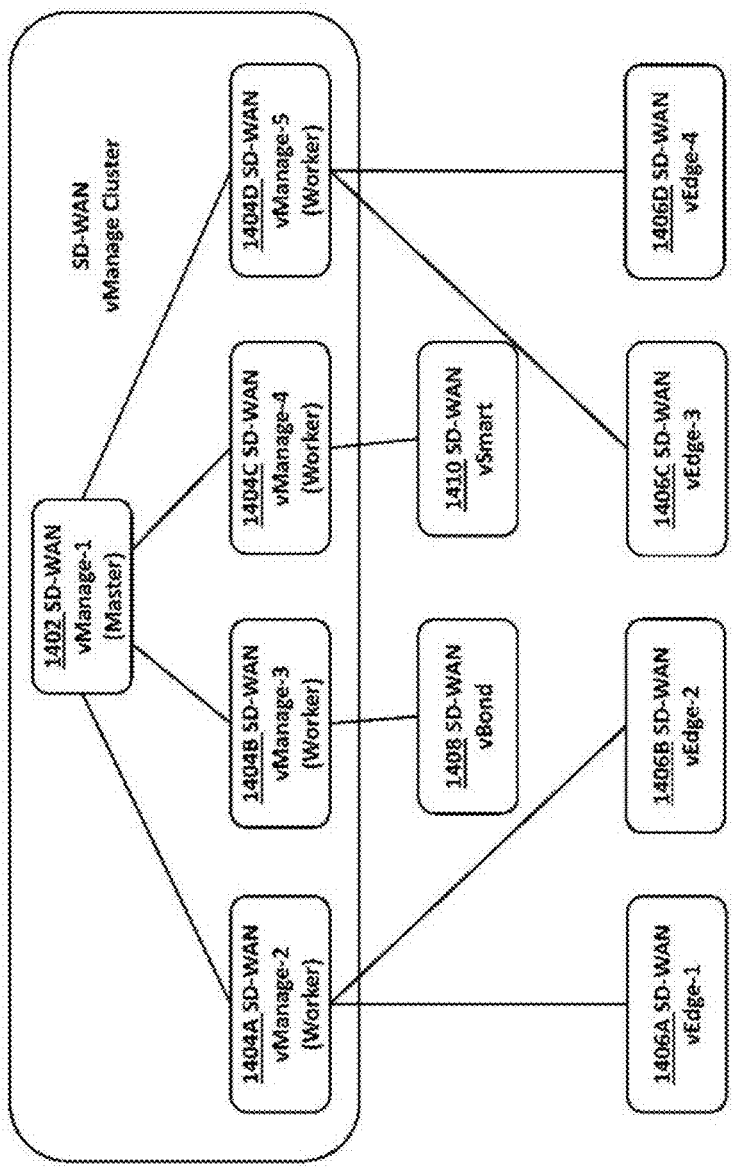
FIG. 14 is a system diagram for SD-WAN cluster deployments, in accordance with some aspects of the disclosed technology.

FIG. 14 is a system diagram for SD-WAN cluster deployments, in accordance with some aspects of the disclosed technology. As shown, a SD-WAN cluster of vManages 1400 includes a Master device (e.g. vMagane-1) and a number of Worker devices (e.g. vManage-2, -3, -4, -5, . . . -N). As shown, the Master or SD-WAN vManage-1 1402 is connected to each of the Worker devices 1404A-D (e.g. SD-WAN vManage-2, SD-WAN vManage-3, SD-WAN vManage-4, and SD-WAN vManage-5) through network connections 1412A-D. The SD-WAN vManage devices may include vManage device/instance 1404A-D, vEdge device/instance 1406A-D, vBond Orchestrators 1408, and vSmart Controllers 1410, among others. The vManage device/instance 1404A may connect to vEdge device/instance 1406A-B. The vManage device/instance 1404D may connect to vEdge device/instance 1406C-D. The vManage device/instance 1404B may connect to vBond Orchestrators 1408. The vManage device/instance 1404C may connect to vSmart Controllers 1410. It will be appreciated by those skilled in the art that the number of the devices and their connections may vary for various deployments. In the cluster of vManages, all cluster members together manage the vBond Orchestrators 1408, vEdge Devices 1406, and vSmart Controllers 1410 in the overlay network. Each vManage server can manage up to about 2000 vEdge routers in the overlay network.

The clustering for SDWAN service offering with SIG is implemented to do load balancing of services, which can also be incorporated for any cluster deployments.

In the cluster deployments, Worker, Member, or Slave can be used interchangeably. Master or Leader can also be used interchangeably.

The SKS requires all the devices to be initialized with a secret seed value so that it can generate a unique pair of PQPSK (ID, Key). The secret seed value is shared using asymmetric key encryption. Further, the SKS generates a unique PQPSK Key corresponding to PQPSK-ID without having any negotiation. This PQPSK Key is used to derive keys for establishing secure connection between Master and Worker vManage devices.

Maintaining a signed nonce of the Worker device or Worker vManage device may help overcome Reply Attack, Man-in-the-middle attack, and identity-verification during a re-connect or rejoin phase. For example, a compromised Worker device may launch Reply Attack to the Master device by frequently initiating re-connect and by using the signed nonce (as identity-verification) and having timestamp based validation (i.e. previous history of connectivity) to overcome such attacks.

With respect to the Man-in-the-middle Attack (MITM attack), a compromised device intercepts the traffic from a legitimate Master device and impersonates it as a Master device to the Worker devices. By signing nonce using the legitimate Master device's public key, during onboarding of the Worker device, any attack by the legitimate device impersonating as the Master device can be detected and avoided.

With respect to identity-verification during re-connect, if a Worker device re-connects or re-joins to the cluster, a Master device validates the Worker device using a SUDI certificate and later validates with the signed nonce which has been shared with the Worker device.

Figure 15:
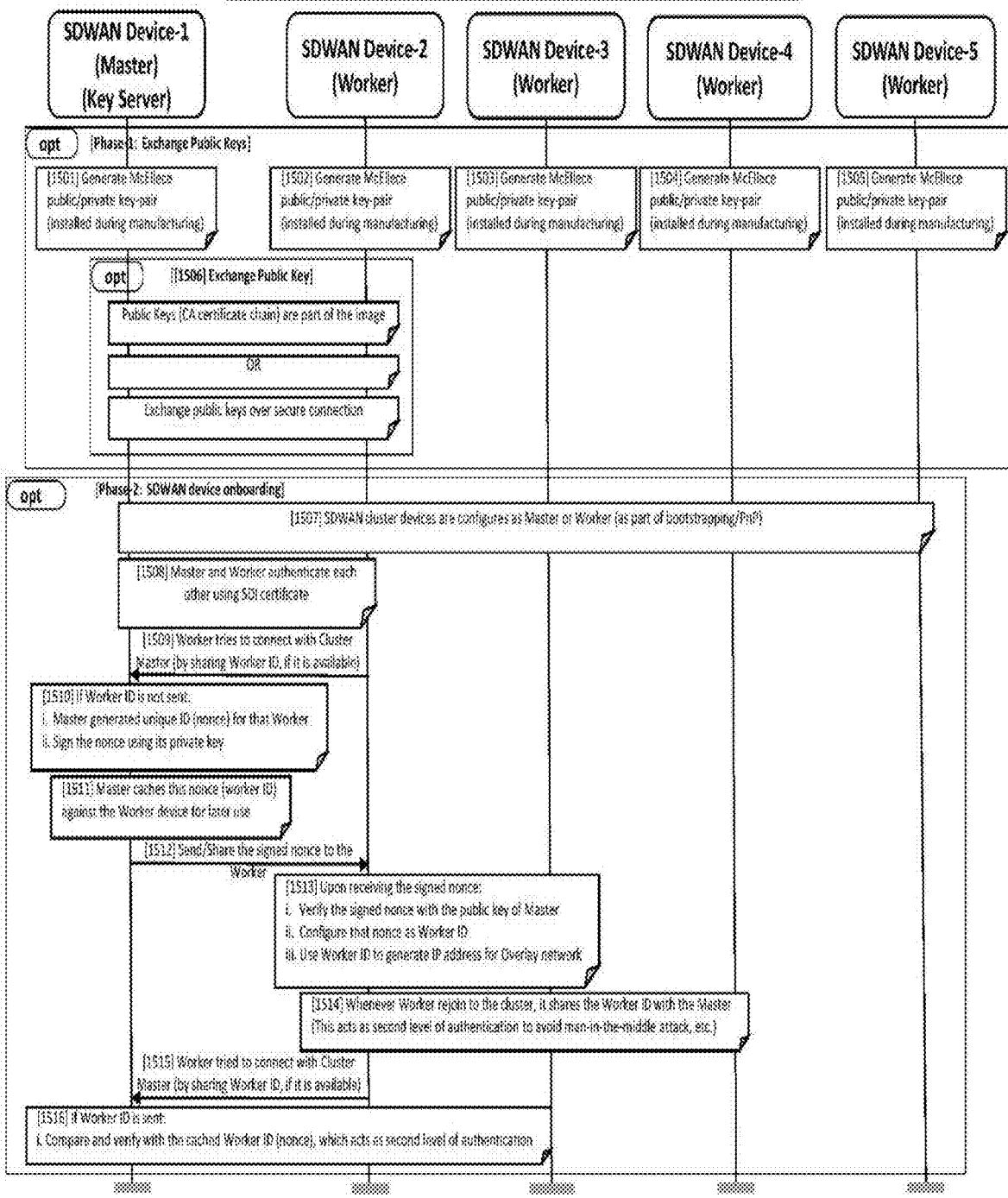
FIG. 15 is a sequence diagram depicting operations in Phase-1 and Phase-2 for post-quantum secure communication in SDWAN cluster deployments, in accordance with some aspects of the disclosed technology.

The steps of the disclosed method can be divided into four phases. FIG. 15 is a sequence diagram depicting operations in Phase-1 and Phase-2 for post-quantum secure communication in SDWAN cluster deployments, in accordance with some aspects of the disclosed technology.

Phase-1 includes exchanging Public keys between the Master and Worker devices at 1501-1505. As part of manufacturing, Private and Public keys are generated on SDWAN cluster devices using a quantum secure algorithm such as McEliece algorithm, which is a one-time process. A manufacturing team generates Private and Public keys using the same root CA (e.g., through PKI). These generated keys are stored on the device/instance (in TPM/vTPM). At 1506, the Public keys (root CA certificate chain) are bundled as part of image, or McEliece's Public keys can be exchanged between the Master and Worker devices over the secure connection to support third party certificates.

Phase-2 includes SDWAN device onboarding. At 1507, SDWAN devices are configured with the role as Master or Worker (as part of bootstrapping/PnP). At 1508, the Master and Worker authenticate each other using SUDI certificate (PKI infrastructure) or using any existing mechanism.

At 1509, the Worker device tries to connect with the Cluster Master by sharing the Worker ID, if it is available. At 1510, if the Worker ID is not sent, the Master device generates a unique Worker ID (nonce) for the Worker and signs the nonce using its private key. At 1511, the Master device caches this nonce (worker ID) against the Worker device for later use. At 1512, the Master device sends the Worker ID to the Worker device or shares the Worker ID with the Worker device.

At 1513, upon the Worker device receiving the signed nonce, the Worker device verifies the signed nonce with the public key of Master and configures that nonce as worker ID. This Worker ID can also be used to generate IP address for Overlay network. For example, Worker ID is 4, the overlay network is 10.15X.0.1, and the IP address of Worker is 10.154.0.1.

At 1514, whenever the Worker device rejoins to the cluster, the Worker device uses this nonce as Worker ID and shares the Worker ID with Master. This nonce (Worker ID) acts as a second level of authentication at the Master to avoid Man-In-The-Middle attack, and to avoid wrong devices entering into the cluster.

At 1515, the Worker device tries to connect with the Cluster Master by sharing the Worker ID, if it is available. At 1516, if the Worker ID is sent, the cluster Master compares and verifies with the cached Worker ID (nonce) which acts as a second level of authentication.

Figure 16:
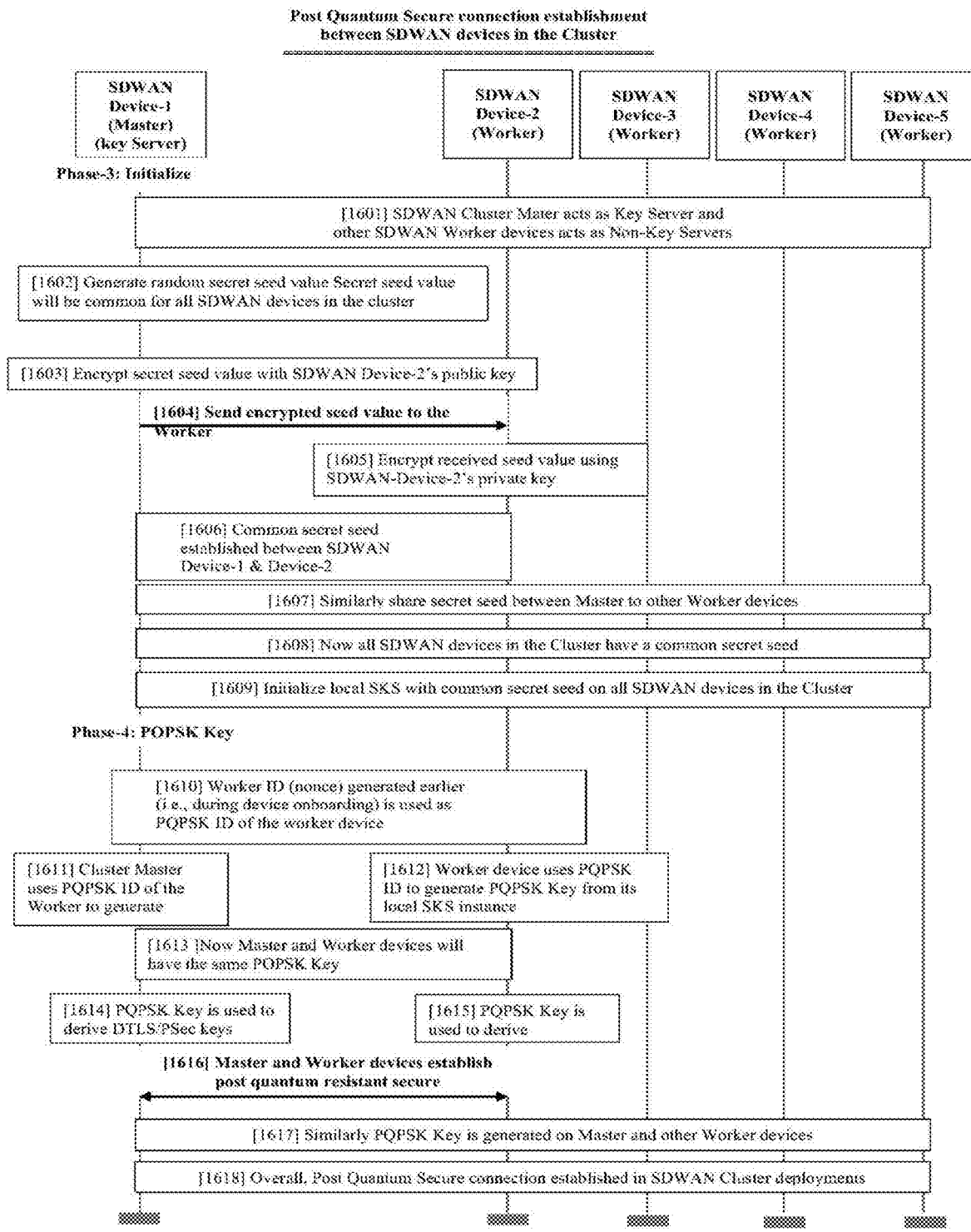
FIG. 16 is a sequence diagram depicting operations in Phase-3 and Phase-4 for post-quantum secure communication in SDWAN cluster deployments, in accordance with some aspects of the disclosed technology.

FIG. 16 is a sequence diagram depicting operations in Phase-3 and Phase-4 for post-quantum secure communication in SDWAN cluster deployments, in accordance with some aspects of the disclosed technology.

Phase-3 includes initializing all local SKS services or servers with a common seed secret across all SDWAN devices which are parts of the same cluster for SDWAN cluster deployments. At 1601, the SDWAN Cluster Master (e.g. SDWAN Device-1) acts as a Key Server while other SDWAN devices or Workers (e.g. SDWAN Device-2, SDWAN Device-3, SDWAN Device-4, SDWAN Device-5) act as Non-Key Servers. At 1602, the Cluster Master generates a random secret seed value.

At 1603, the Cluster Master encrypts the secret seed using another SDWAN device's public key (e.g. SDWAN Device-1). The secret seed value can be common for all SDWAN devices in the cluster. At 1604, the cluster Master transmits the encrypted secret seed value to the Worker (SDWAN Device-2). At 1605, each of the SDWAN Worker devices decrypts the secret seed using its private key. At 1606, the common secret seed is established between the Master and the Worker (SDWAN device-2). At 1607, similar to SDWAN Device-2, the common secret seed is established between the Master and all other SDWAN Worker devices. At 1608, all SDWAN Worker devices in the cluster have the common secret seed. At 1609, all the SDWAN Worker devices initialize their local SKS instances with the common seed secret exchanged as described above.

Phase-4 includes PQPSK Key derivation. As mentioned in Phase-3, all SDWAN worker devices in the cluster initialize their local SKS instances with the common secret seed. Once each of the local SKS instances is initialized with the same secret seed, each local SKS instance generates a unique pair of PQPSK Key and PQPSK-ID. At 1610, the Worker ID (nonce) generated earlier (i.e. during device onboarding) is used as PQPSK-ID of the Worker or Worker device. At 1611, the cluster Master device uses the PQPSK-ID of the Worker to generate a PQPSK Key from its local SKS instance. At 1612, the Worker device uses the PQPSK-ID to generate a PQPSK Key from its local SKS instance. At 1613, the Master and Worker devices have the same PQPSK Key. At 1614 and 1615, the Master and Worker devices can use the PQPSK Key to derive DTLS (e.g. AES-256 key) to establish DTLS connection. The Master and Worker devices can use the PQPSK Key to derive IPsec keys to establish IPSec connection. At 1616, the Master and Worker devices establish post quantum resistant secure connection using the above derived keys. At 1617, similarly, PQPSK key is generated on Master and all other Worker devices. At 1618, post-quantum secure connection is established in SDWAN cluster deployments.

Anytime, the SDWAN Master device refreshes key, the Master and Worker can run the above procedure. Hence, the Master and Worker can refresh their keys at will and without any administrative intervention.

The benefit of the disclosed method includes establishing quantum resistant secure connection between SDWAN Master and Worker devices in cluster deployments, and allowing frequent key refresh with no administrative cost. The disclosed method can provide quantum resistant secure tunnels in large scale cluster deployments (such as SD-WAN, SDN, WiFi, ISP etc.)

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having described several embodiments, it can be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A quantum resistant method for supporting user equipment (UE) roaming across APs/eNBs/gNBs belonging to various Wireless LAN Controllers (WLCs) in enterprise 5G and WiFi co-located deployments, the method comprising:
   initializing a SKS server in an electrical communication with a master WLC with a random post-quantum common secret seed (PQSEED) to generate a post-quantum pre-shared key (PQPSK) and a respective PQPSK-ID;
   sending, by the master WLC, an encrypted PQSEED along with a PQPSK-ID to a second WLC to establish a quantum secure connection with the second WLC;
   joining AP (WiFi) to the master WLC using a CAPWAP/DTLS protocol; and sending the PQPSK-ID from the master WLC to the UE in an EAP success packet when the UE is associated with the AP (WiFi).

2. The method of claim 1, wherein the master WLC generates the PQSEED having a one-time PQSEED value for initializing the SKS server in an electrical communication with the WLC.

3. The method of claim 2, wherein the master WLC encrypts the PQSEED using a public key of the second WLC to generate the encrypted PQSEED.

4. The method of claim 3, wherein the second WLC decrypts the encrypted PQSEED using a private key of the second WLC.

5. The method of claim 4, wherein the decrypted PQSEED initializes a second SKS server in an electrical communication with the second WLC to obtain a respective PQPSK to the PQPSK-ID.

6. The method of claim 1, wherein the UE generates WiFi keys (PMK, GMK) using MSK.

7. The method of claim 6, wherein the UE generates LTE keys using the PMK and PQPSK.

8. The method of claim 7, wherein eNB/gNB joins to the second WLC over S1-MME when the UE roams to the second WLC.

9. The method of claim 8, wherein a MME of the second WLC receives "Attach Request" from the UE using PQPSK-ID along NAS key set identifier, generates KASME using the PQPSK with the PMK, sends Initial Context Setup Request (KeNB, Selected Security Algorithm) to the eNB/gNB, and sends "Attach Accept" (NAS encrypted and Integrity Protected) to the UE.

10. The method of claim 9, wherein the Key Access Security Management Entries (KASME) is used for generating integrity and security keys for a private LTE session by the MME of the second WLC.

11. The method of claim 9, wherein the Initial Context Setup has KeNB keys for eNB/gNB and selected Integrity and Cipher algorithms.

12. The method of claim 11, wherein the eNB/gNB generates KRRC_integrity, KRRC_encryption, KUP_encryption using the KeNB keys.

13. The method of claim 8, wherein a Radio Resource Control (RRC) signaling between the UE and the eNB/gNB is protected by Integrity and Encryption.

14. The method of claim 8, wherein a Network-attached storage (NAS) signaling between the UE and MME/WLC is protected by Integrity and Encryption.

15. The method of claim 8, wherein a User Plane data between the UE and the eNB/gNB is protected by Encryption (ciphered).

16. A system comprising:
one or more processors;
a non-transitory computer readable medium comprising instructions stored therein, the instructions, when executed by the one or more processors, cause the processors perform operations comprising:
initializing a SKS server in an electrical communication with a master WLC with a random post-quantum common secret seed (PQSEED) to generate a post-quantum pre-shared key (PQPSK) and a respective PQPSK-ID;
sending, by the master WLC, an encrypted PQSEED along with a PQPSK-ID to a second WLC to establish a quantum secure connection with the second WLC;
joining AP (WiFi) to the master WLC using a CAPWAP/DTLS protocol; and
sending the PQPSK-ID from the master WLC to the UE in an EAP success packet when the UE is associated with the AP (WiFi).

17. The system of claim 16, wherein the master WLC generates the PQSEED having a one-time PQSEED value for initializing the SKS server in an electrical communication with the WLC.

18. The method of claim 16, wherein the UE generates WiFi keys (PMK, GMK) using MSK and generates LTE keys using the PMK and PQPSK.

19. The method of claim 16, wherein eNB/gNB joins to the second WLC over S1-MME when the UE roams to the second WLC.

20. A non-transitory computer readable medium comprising instructions, the instructions, when executed by a computing system, cause the computing system to perform operations comprising:
initializing a SKS server in an electrical communication with a master WLC with a random post-quantum common secret seed (PQSEED) to generate a post-quantum pre-shared key (PQPSK) and a respective PQPSK-ID;
sending, by the master WLC, an encrypted PQSEED along with a PQPSK-ID to a second WLC to establish a quantum secure connection with the second WLC;
joining AP (WiFi) to the master WLC using a CAPWAP/DTLS protocol; and
sending the PQPSK-ID from the master WLC to the UE in an EAP success packet when the UE is associated with the AP (WiFi).

* * * * *